(12) United States Patent
Reed et al.

(10) Patent No.: US 8,515,656 B2
(45) Date of Patent: Aug. 20, 2013

(54) INTEGRATED AIRCRAFT CARGO LOADING AND MONITORING SYSTEM

(75) Inventors: Blake Allen Reed, Jamestown, ND (US);
Garreth Kavlie, Jamestown, ND (US);
Louis Carl Samuelson, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 465 days.

(21) Appl. No.: 12/543,267

(22) Filed: Aug. 18, 2009

(65) Prior Publication Data

US 2010/0100225 A1    Apr. 22, 2010

Related U.S. Application Data

(63) Continuation-in-part of application No. 11/934,202, filed on Nov. 2, 2007, now abandoned.

(60) Provisional application No. 61/090,426, filed on Aug. 20, 2008.

(51) Int. Cl.
*B64D 9/00* (2006.01)
*G06F 17/00* (2006.01)

(52) U.S. Cl.
USPC .......................... 701/124; 701/3; 244/137.1

(58) Field of Classification Search
USPC ............... 701/1, 2, 3, 36, 124; 700/214, 215, 700/217, 218, 83, 213; 244/118.1, 118.2, 244/137.1
See application file for complete search history.

(56) References Cited

U.S. PATENT DOCUMENTS

| | | | |
|---|---|---|---|
| 5,661,384 | A | 8/1997 | Glibbery |
| 6,577,339 | B1 | 6/2003 | Thompson et al. |
| 6,696,957 | B2 | 2/2004 | Shepher |
| 6,834,758 | B2 | 12/2004 | Nguyen et al. |
| 6,844,817 | B2 | 1/2005 | Gleine |
| 6,867,702 | B2 | 3/2005 | Huber et al. |
| 6,877,694 | B2 | 4/2005 | Gonzalez |
| 7,003,374 | B2 | 2/2006 | Olin et al. |
| 7,198,227 | B2 | 4/2007 | Olin et al. |
| 7,199,543 | B1 | 4/2007 | Hettwer |
| 2002/0145524 | A1 | 10/2002 | Shepher |

(Continued)

FOREIGN PATENT DOCUMENTS

| | | |
|---|---|---|
| CA | 2 433 480 A1 | 1/2004 |
| DE | 101 46 657 A1 | 4/2003 |

(Continued)

OTHER PUBLICATIONS

Official Action issued Aug. 23, 2011 (U.S. Appl. No. 11/934,202, filed Nov. 2, 2007), pp. 1-25.

(Continued)

*Primary Examiner* — Christine Behncke
(74) *Attorney, Agent, or Firm* — Cantor Colburn LLP

(57) ABSTRACT

A cargo loading and monitoring system for an aircraft having a plurality of separate cargo compartments includes a processor in communication with a plurality of power drive units located within a first cargo compartment. A cargo monitoring display unit is located in a second cargo compartment that is separate from the first cargo compartment, and is in communication with the processor. The cargo monitoring display unit is configured to selectively display information received from the power drive units.

20 Claims, 24 Drawing Sheets

(56) References Cited

U.S. PATENT DOCUMENTS

| | | |
|---|---|---|
| 2003/0117494 A1 | 6/2003 | Poblete |
| 2003/0179079 A1* | 9/2003 | Huber et al. ............. 340/286.01 |
| 2003/0215143 A1 | 11/2003 | Zakrzewski et al. |
| 2004/0145498 A1 | 7/2004 | Carroll |
| 2004/0149859 A1 | 8/2004 | Komiyama |
| 2004/0251384 A1 | 12/2004 | Sprenger |
| 2005/0225635 A1 | 10/2005 | Meitzler et al. |
| 2005/0258943 A1 | 11/2005 | Mian et al. |
| 2006/0024237 A1 | 2/2006 | Mackles |
| 2006/0038077 A1* | 2/2006 | Olin et al. .................. 244/137.1 |
| 2006/0133913 A1 | 6/2006 | Helmner |
| 2006/0220842 A1 | 10/2006 | Breed |
| 2007/0241897 A1 | 10/2007 | Knuepfer |
| 2007/0252038 A1 | 11/2007 | Alvarez |
| 2008/0024605 A1 | 1/2008 | Osann |
| 2008/0135681 A1 | 6/2008 | Hearing et al. |
| 2008/0315037 A1 | 12/2008 | Merz et al. |
| 2009/0040367 A1 | 2/2009 | Zakrzewski et al. |
| 2009/0105874 A1* | 4/2009 | Tietjen et al. ................. 700/217 |
| 2009/0121085 A1 | 5/2009 | Hettwer |
| 2009/0261203 A1* | 10/2009 | Gouette et al. ............. 244/137.1 |

FOREIGN PATENT DOCUMENTS

| | | |
|---|---|---|
| DE | 102 12 123 A1 | 10/2003 |
| DE | 102 29 666 A1 | 1/2004 |
| DE | 102005026898 A1 | 1/2006 |
| DE | 102008052468 A1 | 5/2009 |
| GB | 2 354 991 A | 4/2001 |
| GB | 2 443 554 A | 5/2008 |
| WO | WO 99/06275 A1 | 2/1999 |
| WO | WO 03/076267 A1 | 9/2003 |
| WO | WO 03/105480 A1 | 12/2003 |
| WO | WO 2004/030336 A2 | 4/2004 |
| WO | WO 2005/056350 A1 | 6/2005 |
| WO | WO2006074908 * | 7/2006 |

OTHER PUBLICATIONS

Official Action issued Oct. 20, 2011 (DE App. No. 10 2009 037 982.7, filed Aug. 19, 2009), pp. 1-6.

English translation of Official Action issued Oct. 20, 2011 (DE App. No. 10 2009 037 982.7, filed Aug. 19, 2009), pp. 1-4.

Cabin Video Surveillance and Visual Awareness System Overview, ASG, Inc. Sep. 26, 2006, pp. 1-23.

In-Flight Video Security Systems, Goodrich Corporation, Aug. 2003, p. 1.

Official Action issued Dec. 18, 2008 (Appln. No. DE 10 2007 052 633.6-22, filed Nov. 5, 2007).

English translation of Official Action issued Dec. 18, 2008 (Appln. No. DE 10 2007 052 633.6-22, filed Nov. 5, 2007).

Sensor Systems—MFD Video System, Goodrich Corporation, May 2006, pp. 1-2.

Sensor Systems—Electronic Flight Bag System, Goodrich Corporation, May 2006, pp. 1-4.

Sensor Systems, EFB Video System, Goodrich Corporation, May 2006, pp. 1-2.

Sensor Systems—Video Surveillance Systems, Goodrich Corporation, May 2006, pp. 1-4.

Search and Examination Report, UK Intellectual Property Office, UK Application GB 0721612.0, Feb. 22, 2008, pp. 1-4.

Search and Examination Report, UK Application GB 0721612.0, Aug. 8, 2008, pp. 1-2.

* cited by examiner

INTEGRATED AIRCRAFT CARGO LOADING
AND MONITORING SYSTEM

RELATED APPLICATIONS

This application is a continuation in part of application Ser. No. 11/934,202, filed Nov. 2, 2007, and claims the benefit of priority of provisional application Ser. No. 61/090,426 filed Aug. 20, 2008, the disclosures of which are hereby incorporated by reference in their entireties.

FIELD OF THE INVENTION

The invention relates to systems for aircraft, and more particularly relates to an integrated system for monitoring and managing aircraft cargo loading and unloading activities, and for remotely monitoring an aircraft's cargo compartments and related cargo system components and systems.

BACKGROUND

With the increasing emphasis on expedited "overnight" shipments, the number and volume of air cargo shipments is increasing. Some aircraft used for air cargo shipments are configured to transport only cargo, while other aircraft are configured to transport both passengers and cargo.

Typically, items being shipped by air are first loaded onto specially configured pallets or into specially configured containers. In the airfreight industry, these various pallets and containers are commonly referred to as Unit Load Devices ("ULDs"). ULDs are available in various sizes, shapes and capacities, and typically bear external markings that identify their type, maximum gross weight, tare weight, and other pertinent information.

A ULD typically is loaded with cargo at a location that is distant from the immediate vicinity of an aircraft. Once a ULD is loaded with cargo items, the ULD is weighed, transferred to the aircraft, and is loaded onto an aircraft through a doorway or hatch using a conveyor ramp, scissor lift, or the like. Once inside the aircraft, a ULD is moved about the cargo compartment until it reaches a final stowage position. Multiple ULDs are brought onboard the aircraft, and each is placed in its respective stowed position.

Various types of aircraft that are used to exclusively transport cargo have variously arranged cargo compartments for receiving and stowing ULDs. As shown in FIGS. 1 and 2, a typical large cargo aircraft 10 includes a forward cargo compartment 12a and an aft cargo compartment 12b located beneath the aircraft's main deck 16, and within the aircraft's "lower lobe." These cargo compartments commonly are referred to as the "forward lower lobe" 12a and the "aft lower lobe" 12b, respectively. In addition to forward and aft lower lobes 12a, 12b, a typical large cargo aircraft 10 often is equipped to receive and stow ULDs 18 on its main deck 16 in a main deck cargo compartment 14. A cargo aircraft 10 may be loaded with ULDs of various types, shapes, and sizes. As shown in FIG. 2, spaces or gaps typically exist between and around at least some adjacent ULDs 18 in their stowed positions.

To facilitate movement of a ULD within an aircraft cargo compartment as the ULD is loaded, stowed, and unloaded, the deck of an aircraft cargo compartment typically includes a number of raised roller elements. These roller elements often include elongated roller trays that extend longitudinally along the length of the cargo deck, ball panel units, and the like. For example, roller trays typically include elongated rows of cylindrical rollers that extend in a fore and aft direction. Ball panel units include plates with upwardly protruding spherical balls. The ULDs sit atop these roller elements, and the roller elements facilitate rolling movement of the ULDs within the cargo compartment. Cargo decks also commonly are equipped with one or more power drive units (PDUs). PDUs are electrically powered rollers that can be selectively raised above the roller elements, and selectively energized to propel a ULD across a cargo deck in a desired direction. One example of a PDU is described in U.S. Pat. No. 6,834,758 to Goodrich Corporation. Some PDUs may be equipped with one or more sensors for detecting the presence or absence of a ULD directly above the PDU. An example of one such ULD-sensing PDU is described in co-pending U.S. patent application Ser. No. 11/469,643 filed Sep. 1, 2006, and assigned to Goodrich Corporation.

Typically, a person responsible for loading or unloading ULDs selectively controls operation of an aircraft's PDUs from a master cargo control panel 20, like that shown in FIG. 3. Typically, such a master cargo control panel 20 typically is located at a convenient location near the doorway of an aircraft's main deck and/or lower cargo deck. An aircraft may also be equipped with one or more local cargo control panels 30 like that shown in FIG. 4. The control panels 20, 30 are configured to permit a person to selectively raise and engage one or more PDUs with a pre-positioned ULD, and to selectively activate the PDU to propel the ULD in a forward or aft direction within a cargo compartment.

Once a ULD is moved to its final stowed position, the ULD must be restrained against both vertical and lateral movement during flight. Accordingly, the deck and sidewalls of a cargo compartment typically include a plurality of restraint devices that selectively engage the stowed ULD, and keep the ULD stationary. One example of such a restraint is a latch that is removably fixed to the floor, and is selectively movable between a deployed (latched) position and a retracted (unlatched) position. In the deployed position, an engaging member of the latch is upright, and protrudes above the upper surface of the roller elements. In the retracted position, the engaging member is recessed below the upper surface of the roller elements such that the engaging member will not interfere with movement of a ULD passing overhead. The engaging member can be manually moved between its deployed and retracted. Such restraint latches are known in the art, and are commercially available in various types and sizes. The restraint latches are positioned at predetermined "install points" on a cargo deck. Such install points coincide with deck locations having features for receiving and retaining a restraint latch, such as recesses, holes, slots, pins, cutouts, or the like. One example of an install point is a recess between upwardly extending rails of a roller track recessed within a cargo deck. Installation points also commonly are provided along side rails on sidewalls of the cargo compartments.

A typical aircraft cargo deck may include several hundred install points. However, for a given cargo configuration, not all install points are populated with restraints due to weight and cost considerations. For example, on a cargo deck having about eight hundred total install points, only about three hundred of the install points may require restraints. Usually, an aircraft operator will consider the types and sizes of ULDs that are likely to be required for a particular load configuration, and will install the appropriate number of restraints before cargo loading according to such projections.

Each ULD normally requires multiple restraint devices, and different types of ULDs require different numbers of restraints. Operational criteria for each ULD specify the required number, type and locations of restraints based on a ULDs maximum gross weight. Such operational criteria also specify a reduced maximum gross weight for situations where one or more of the required restraints are missing or otherwise unavailable. Thus, on a given flight, if one of several restraints to be used to secure a ULD is damaged or missing, that ULD may still be transported in the chosen position, but only if it meets the reduced maximum gross weight specification.

The number of ULDs, the types of ULDs to be transported, and the weight of each ULD often vary between flights. Care must be taken when loading aircraft with cargo to ensure that the final weight and balance of the aircraft is acceptable. An aircraft's performance and handling characteristics are affected by the aircraft's gross weight and its effective center of gravity. An overloaded or improperly balanced aircraft will require more power and greater fuel consumption during flight, and the aircraft's stability and controllability may be affected.

Before ULDs are loaded onto an aircraft, a person in charge of the loading activities (hereinafter the "load master") develops a desired load configuration that contemplates the aircraft's weight and balance criteria, and the number, types and weights of the ULDs to be loaded. The load configuration defines where each of the ULDs should be located on a cargo deck. In its simplest form, a load configuration can be a two-column list that includes a first column identifying each ULD, and a second column identifying a desired stowed position for each ULD.

Typically, a loading crew tasked with loading an aircraft receives a printed copy of the loadmaster's load configuration. In order to ensure that each ULDs operational restraint requirements are satisfied, ground crew members ensure that restraints of the correct type are installed at the various install points required by the load configuration. Often, a loading crewmember tasked with configuring restraints according to a given loading configuration must rely on his familiarity with various ULDs, restraints, and cargo deck equipment. The loading crewmember also may be assisted by color-coded markings on the cargo deck that designate install points and the like. The loading crewmember performs a visual inspection, and determines whether operable restraints of the correct types are installed at the correct install points for each ULD to be loaded onto the aircraft.

During inspection, a loading crewmember may discover a missing, damaged, or inoperable restraint. In such a case, the crewmember typically reports such findings to the loadmaster, who then may check the ULD operational criteria to determine whether a ULD with a lighter weight or of a different type might be relocated to an affected ULD location. Sometimes, a restraint may be moved from one install point to another install point having a missing or damaged restraint, such that restraint requirements for all ULDs ultimately are satisfied.

In order to assist air cargo loading crews, automated cargo loading systems have been developed. One such automated cargo loading system is described in published U.S. Pat. No. 7,198,227, assigned to Goodrich Corporation, which is hereby incorporated by reference. The described system is configured to automatically identify, track, and report the positions of ULDs within an aircraft in real time, thereby permitting a person who is remote from loaded ULDs to monitor the current status of loading or unloading activities. In such a system, each ULD may include a machine-readable wireless tag that includes identification information and other information specific to a particular ULD. Local and long range wireless tag readers positioned at various points within an aircraft can be used to identify the presence and specific real-time location of any ULD that is onboard an aircraft. Such a system can include one or more remote visual displays that present visual representations of the real-time locations of each ULD.

In rare instances, as ULDs are loaded and unloaded from an aircraft, the ULDs and/or their contents can be subject to unauthorized tampering, theft, vandalism, and the like. More frequently, the ULDs and/or their contents can be damaged during loading or unloading activities, or during transport. Such unauthorized activities and/or damage can be costly to air cargo carriers. Commonly, such unauthorized activities and/or damage may not be discovered until after a ULD reaches its destination. In addition, the cause or source of damage, theft, tampering, or vandalism to a ULD and/or its contents may not be apparent or discoverable once the damage, theft, tampering, or vandalism is discovered. In addition, an aircraft's cargo compartment and ULDs can sometimes be used by unauthorized persons to smuggle illicit items and materials.

Accordingly, there is a need for a system and method for surveying, monitoring, and recording activities and events that occur within an aircraft's cargo compartments, especially during loading and unloading activities. Preferably, such a system and method will assist air cargo carriers in determining the causes and/or sources of cargo tampering or damage, and will establish an evidentiary record of such activities and events. In addition, such a system and method preferably will be compatible with other onboard cargo loading and logistics systems, and even more preferably, will be integrated with such other onboard cargo systems.

SUMMARY

In one embodiment, the invention includes a cargo loading and monitoring system for an aircraft having a plurality of separate cargo compartments. The system includes a processor in communication with a plurality of power drive units located within a first cargo compartment. A cargo monitoring display unit is located in a second cargo compartment that is separate from the first cargo compartment and is in communication with the processor and configured to selectively display information received from the power drive units.

In another embodiment, a cargo loading and monitoring system for an aircraft having a plurality of separate cargo compartments includes a first processor and a plurality of power drive units within a first cargo compartment. Each power drive unit is coupled to the first processor. At least one sensor in the first cargo compartment is configured to detect the location of a cargo container within the first cargo compartment. A second processor in communication with the first processor, the power drive units, and the sensor is operable to receive information from the first processor, the power drive units, and the sensor. The second processor includes a cargo monitoring display unit located in a second cargo compartment that is separate from the first cargo compartment. The cargo monitoring display unit is configured to selectively display information received from the cargo loading processor, the power drive units and the sensor.

The invention also includes a method of remotely monitoring a process of loading a plurality of cargo containers into a first cargo compartment of an aircraft having a plurality of power drive units located in the first cargo compartment. The method includes determining the locations of the cargo containers within the first cargo compartment, and determining the status of each of the power drive units in the first cargo compartment. The method further includes, in a second cargo compartment which is separate from the first cargo compartment, graphically displaying the locations of the cargo containers within the first cargo compartment and the status of each of the power drive units in the first cargo compartment.

These and other aspects and features of the invention will be understood from a reading of the following detailed description together with the drawings.

DETAILED DESCRIPTION

Figure 5:
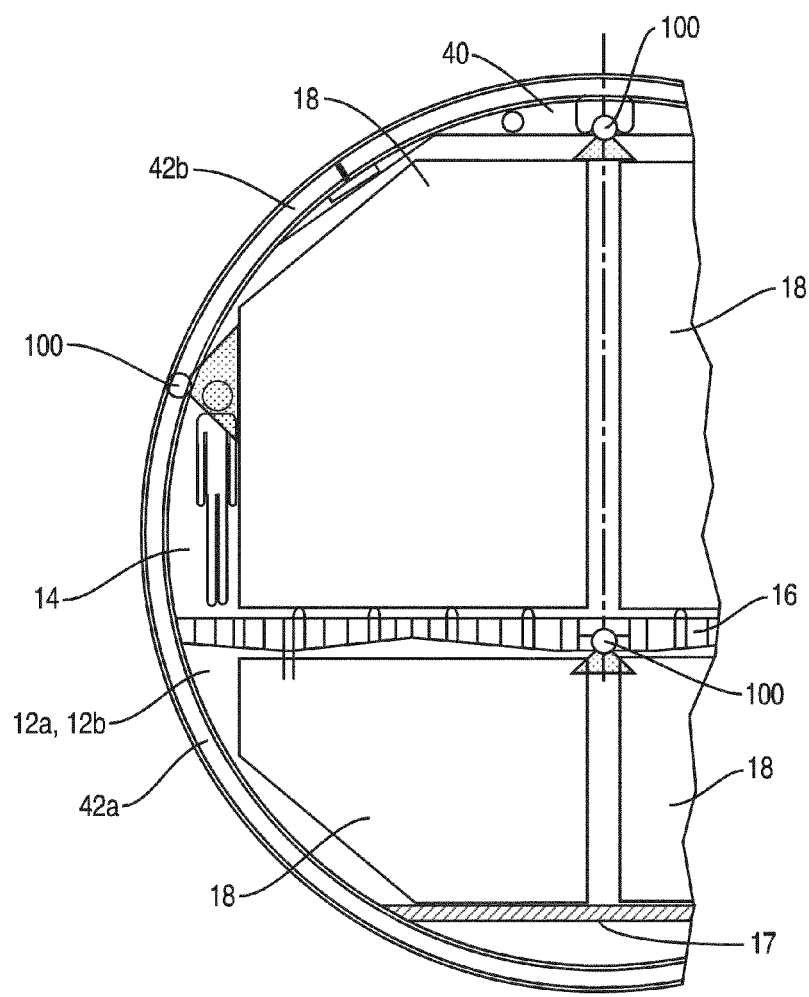
FIG. 5 is a cross sectional view of a cargo aircraft showing possible camera locations within the aircraft's main deck and lower lobe cargo compartments.

As shown in FIGS. 5-12, a system and method according to the invention includes one or more cameras 100 strategically positioned within an aircraft cargo compartment, such as in a forward lower lobe 12a, an aft lower lobe 12b, or a main deck cargo compartment 14. As shown in FIG. 5, in one embodiment, a camera 100 can be mounted in or on a ceiling 40, 16, and/or in or on a sidewall 42a, 42b of a cargo compartment 12a, 12b, 14. As shown in FIG. 5, when a camera 100 is mounted in or on an upper portion of a sidewall 42a, 42b, the camera 100 may be slightly tilted downward, such as about twenty degrees below horizontal, for example. In one embodiment, a plurality of cameras 100 are positioned within each of the cargo compartments 12a, 12b, 14 such that the combined fields of view of the plurality of cameras 100 at least include a substantial portion of each one of the cargo compartments 12a, 12b, and 14. Preferably, the cameras 100 are positioned such that a substantial portion of each unloaded region of a cargo compartment 12a, 12b, and 14 remains visible by at least one camera 100 as the aircraft is loaded and unloaded. If a cargo compartment normally is loaded such that one or more loaded ULDs will at least partially obstruct the field of view of at least one camera 100 within the cargo compartment, it is desirable to have at least one additional camera 100 that remains unobstructed by such loaded ULDs, and includes a substantial portion of remaining unloaded regions of the cargo compartment within its field of view.

Figure 6:
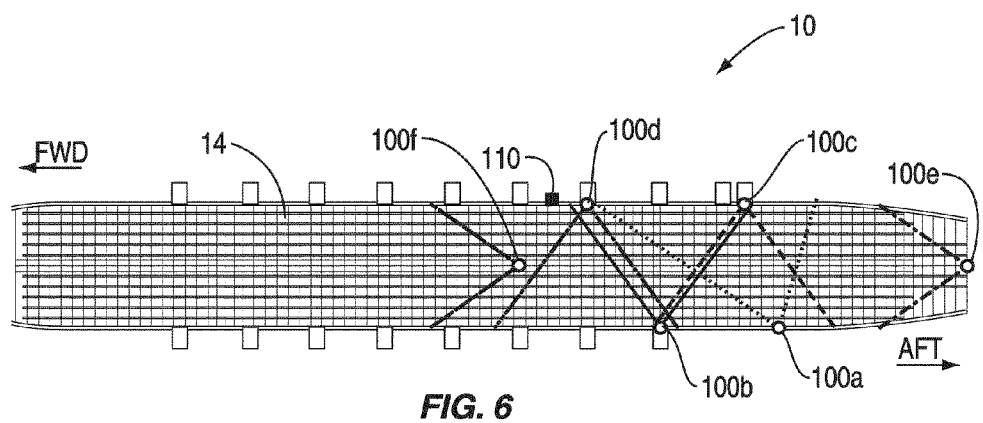
FIGS. 6-8 are plan views of an aircraft's main deck cargo compartment showing various combinations of main deck camera locations.

FIG. 6 shows one arrangement of six cameras 100a-100f positioned at various locations within a main deck cargo compartment 14 of an aircraft 10. In this arrangement, a first camera 100a is positioned on a left sidewall in an aft portion of the compartment 14. The field of view of the first camera 100a (and field of view of each of the other cameras 100b-100h described below) is within an acute angle formed by the two lines shown radiating from the camera's location. In the arrangement shown, the first camera 100a is angled approximately twenty degrees toward the forward end of the compartment 14. As also shown in FIG. 6, the second, third, and fourth cameras 100b-100d are staggered along left and right sidewalls of aft portions of the cargo compartment 14. The second, third, and fourth cameras 100b-100d each are generally pointed toward an opposite sidewall. A fifth camera 100e is mounted in the ceiling at the aft end of the main deck cargo compartment 14, and a sixth camera 100f is mounted in the ceiling at about a longitudinal midpoint of the compartment 14. In this arrangement, the sixth camera 100f is positioned such that the camera 100f can view substantially the entire forward portion of the cargo compartment 14 as ULDs are loaded from forward to aft. Similarly, the fifth camera 100e is positioned such that the camera 100e can view aft portions of the cargo compartment 14 as ULDs are loaded from forward to aft. The sidewall-mounted cameras 100a-100d are positioned such that at least one of the cameras 100a-100d is capable of viewing substantially any portion of the aft region of the cargo compartment 14 as freight is loaded into the aft region, though the field of view of one or more other cameras may be obstructed by one or more loaded ULDs.

Figure 7:
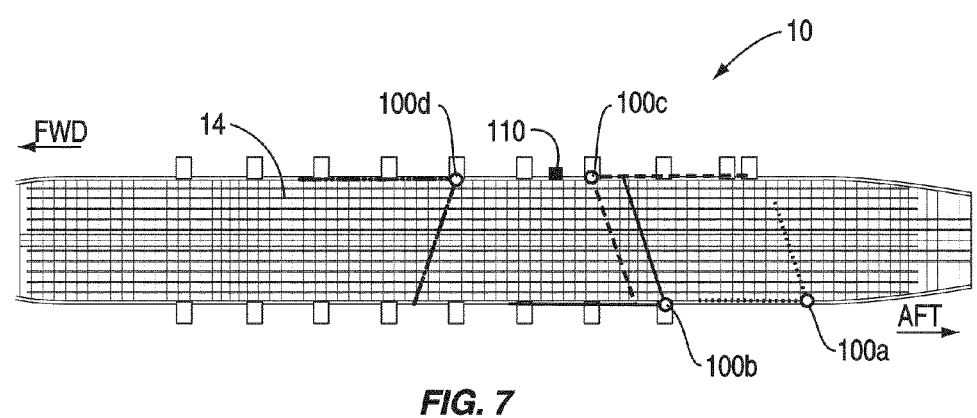

FIG. 7 shows an alternative arrangement of a plurality of cameras 100a-100d within a main cargo compartment 14 of an aircraft 10. In this arrangement, four rather than six cameras 100 are positioned at various locations within the compartment 14. A first camera 100a is positioned on a left sidewall in an aft portion of the compartment 14. In the arrangement shown, the first camera 100a is angled approximately thirty-five degrees toward the forward end of the compartment 14. As also shown in FIG. 7, the second camera 100b and third camera 100c are staggered along left and right sidewalls of aft portions of the cargo compartment 14, and also are angled about thirty-five degrees in a forward direction. A fourth camera 100d is mounted in or on a right sidewall at about a longitudinal midpoint of the compartment, and is offset approximately thirty-five degrees toward the forward end of the compartment 14. In this arrangement, no ceiling-mounted cameras 100 are used.

Figure 8:
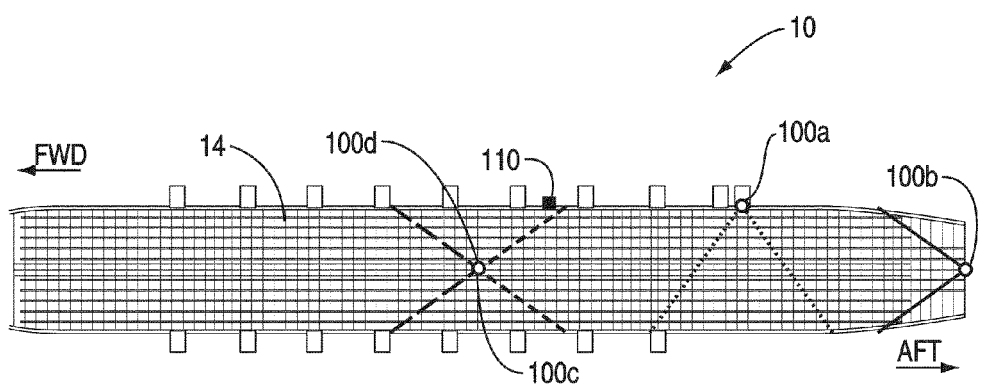

Still another arrangement of cameras 100a-100d within a main deck cargo compartment 14 of an aircraft 10 is shown in FIG. 8. In this arrangement, a first camera 100a is positioned along a right sidewall in an aft portion of the compartment 14, and has no forward or aft offset. A second camera 100b is mounted in or on a ceiling at or near an aft end of the compartment 14, and is directed in a forward direction. A third camera 100c and a fourth camera 100d are mounted in or on a ceiling near a midpoint of the compartment 14, and are respectively directed in aft and a forward directions.

Accordingly, as indicated in FIGS. 6-8, various numbers, positions, and angles of cameras 100 can be provided for viewing various regions of a main deck cargo compartment 14. All such configurations are designed, however, to provide substantially unobstructed views of substantial portions of all unoccupied regions of the main deck compartment 14 during loading and unloading of ULDs. As shown in FIG. 5, the cameras 100 also provide views of at least some regions between and around stowed ULDs 18.

Figure 9:
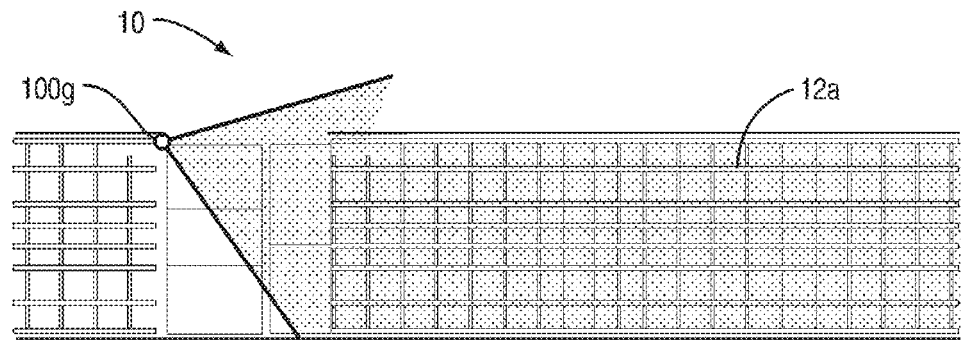
FIGS. 9-12 are plan views of an aircraft's forward and aft lower lobe cargo compartments showing various combinations of main deck camera locations.
Figure 10:
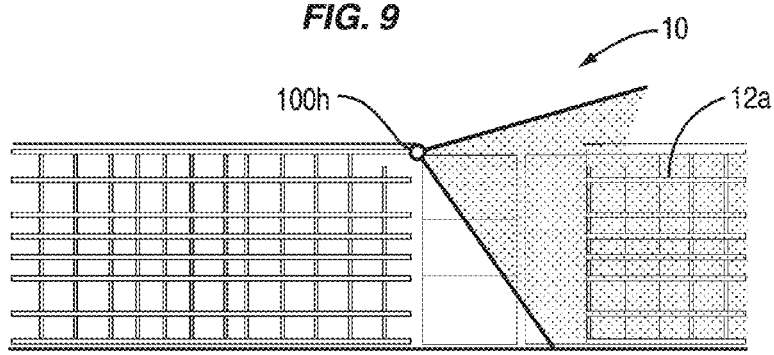
Figure 11:
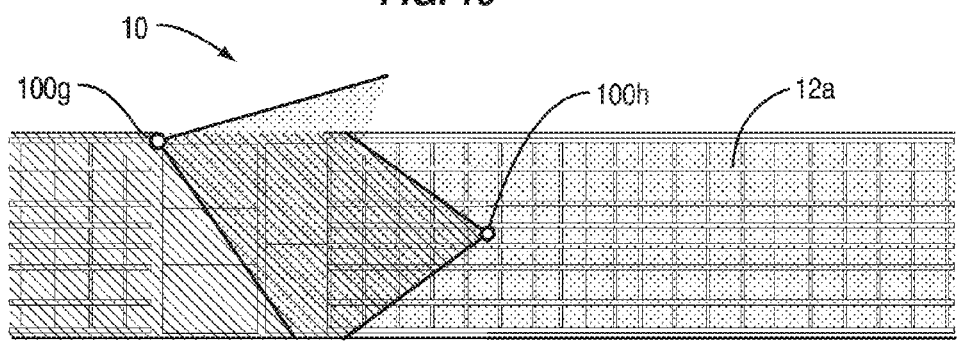
Figure 12:
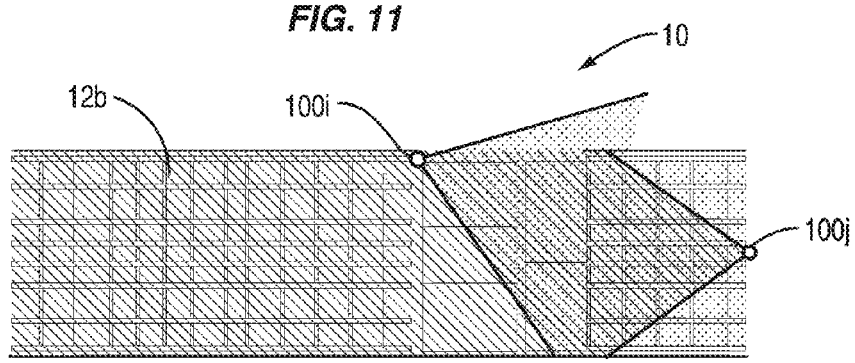

FIGS. 9-12 show several different of arrangements of cameras within forward and aft lower lobes 12a, 12b of an aircraft 10. In FIGS. 9 and 12, a first lower lobe camera 100g is positioned in or on a sidewall in a forward portion of a forward lower lobe cargo compartment 12a. As shown in FIG. 9, the first lower lobe camera 100g can be angled toward the aft end of the lower lobe 12a. As shown in FIG. 10, a second lower lobe camera 100h is positioned along a right sidewall of the aft lobe compartment 12b, and is angled toward an aft direction. The first and second lower lobe cameras 100g, 100h combine to provide views of substantially all regions of the forward and aft lower lobes 12a, 12b during cargo loading and unloading.

In another lower lobe camera arrangement shown in FIGS. 11 and 12, the forward lobe compartment 12a includes a first lower lobe camera 100g that is positioned and angled substantially the same as the first lower lobe camera shown in FIG. 9. In this arrangement, however, a ceiling-mounted second lower lobe camera 100h is provided for viewing the forward most regions of the forward lobe 12a. As shown in FIG. 12, the aft lobe compartment 12b can include a third lower lobe camera 100i that is positioned and angled substantially the same as the second lower lobe camera 100h shown in FIG. 10. In this arrangement, however, a ceiling-mounted fourth lower lobe camera 100j also is provided for viewing the forward most regions of the aft lobe 12b.

The total number of cameras 100 provided within a main deck cargo compartment 14 and within associated lower lobe compartments 12a, 12b can depend on a number of factors. For example, the total number of cameras 100 that can be installed within the cargo compartments 14, 12a, 12b of an aircraft 10 may be limited by the aircraft's power or weight constraints. The total number of cameras 100 also may be dictated by the capacity of one or more related video system components, such as by the input capacity of an associated video controller, or the like. In one embodiment, an aircraft cargo video system according the invention includes six-eight cameras 100 distributed between a main deck cargo compartment 14 and lower lobe cargo compartments 12a, 12b.

Figure 13:
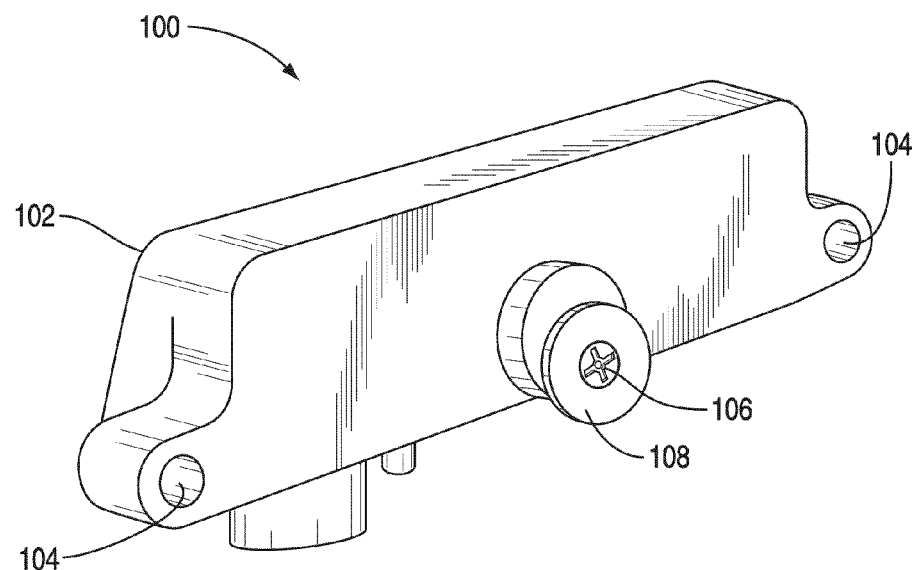
FIG. 13 is a perspective view of a compact video camera.

A system and method according to the invention may include cameras 100 that provide periodic still images of associated cargo compartments 12a, 12b, 14. In a preferred embodiment, however, the cameras 100 are video cameras capable of providing continuous live video images of their associated cargo compartments 12a, 12b, 14. One embodiment of a video camera 100 suitable for use in the present invention is shown in FIG. 13. In this embodiment, the camera 100 includes a housing 102 having one or more holes 104 for receiving bolts or screws or the like (not shown) for mounting the camera 100 to an aircraft. The camera 100 can include a small lens or aperture 106. In the embodiment shown, the lens or aperture 106 is disposed at the center of a simulated fastener head 108 that at least partially camouflages the lens or aperture 106 from view. The camera 100 is provided with a suitable connector 110 for electrically connecting the camera 100 to a compatible video controller. Preferably, the camera 100 is compact and lightweight. In the embodiment shown in FIG. 13, the camera 100 is less than about six inches long, is about 2 inches tall, is less than about two inches deep, and weighs less than about 0.5 lb.

In one embodiment, the camera 100 is an NTSC format video camera with about 575 TV lines resolution. The camera 100 preferably conforms to RTCA/DO-160 environmental and electrical requirements, and meets or exceeds aircraft flammability requirements. Preferably, the camera 100 has low light capability that provides high quality video images at normal cargo compartment illumination levels. In one embodiment, the camera 100 has a CCD rating of about 0.003 lux, and is capable of capturing satisfactory images at illumination levels as low as about 0.1 lux. Optionally, the camera 100 may include infrared capability for detecting heat sources in extreme low-light conditions. The camera 100 also may include a heated lens assembly that substantially prevents the camera's lens from being obscured by condensation or frost. The camera 100 is designed to endure rigorous in-flight conditions, and preferably has a mean time between failures ("MTBF") of at least about 30,000 hours. In one embodiment, each camera 100 has a field of view between about seventy degrees and about ninety degrees. Alternatively, a camera 100 can have smaller or larger viewing angle for a specific camera application or camera location.

Figure 14:
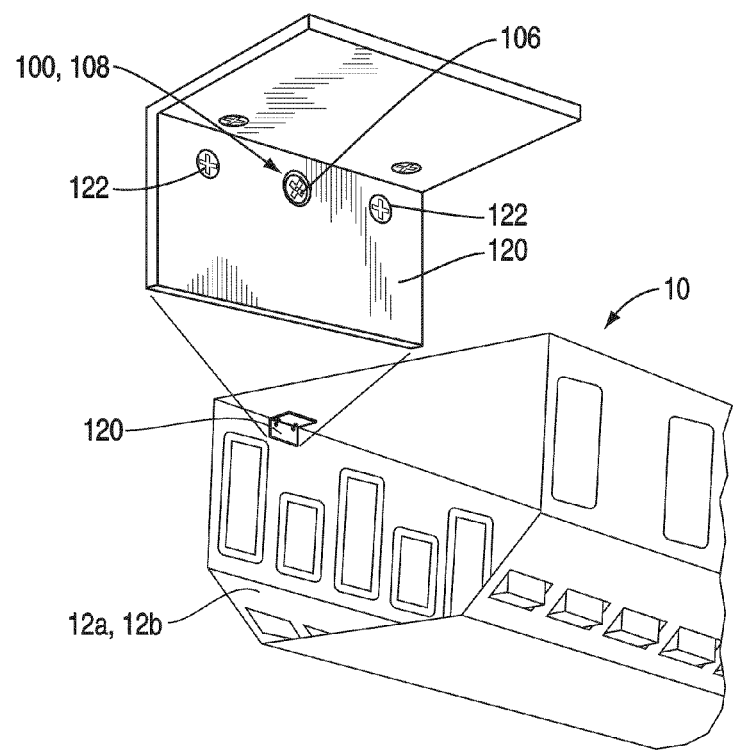
FIG. 14 is a perspective view of a portion of an aircraft lower lobe cargo compartment showing a video camera like that shown in FIG. 13 installed in a compartment sidewall.

FIGS. 14-17 show various arrangements for mounting a camera 100 like that described above along a sidewall of an aircraft cargo compartment 12a, 12b, 14. As shown in FIG. 14, a camera 100 can be mounted behind a concealment panel 120 located on an upper portion of a sidewall of a lower lobe cargo compartment 12a, 12b of an aircraft 10. The camera 100 can be mounted on a rear side of the panel 120 by one or more mechanical fasteners 122. The simulated fastener head 108 may extend through the panel 120, and may be configured such that it has substantially the same appearance as the exposed heads of the fasteners 122. Though the bulk of the camera 100 is hidden from view behind the panel, the lens or aperture 106 is exposed to an interior portion of the lower lobe cargo compartment 12a, 12b. A similar arrangement can be used to mount and conceal a camera 100 within a main deck cargo compartment 14 (not shown in FIG. 14). Because the camera 100 is substantially hidden from view from within a cargo compartment 12a, 12b, 14, persons within the cargo compartment will not recognize the camera 100 is present, and thus will not tamper with, obstruct, or intentionally avoid the camera 100.

Figure 15:
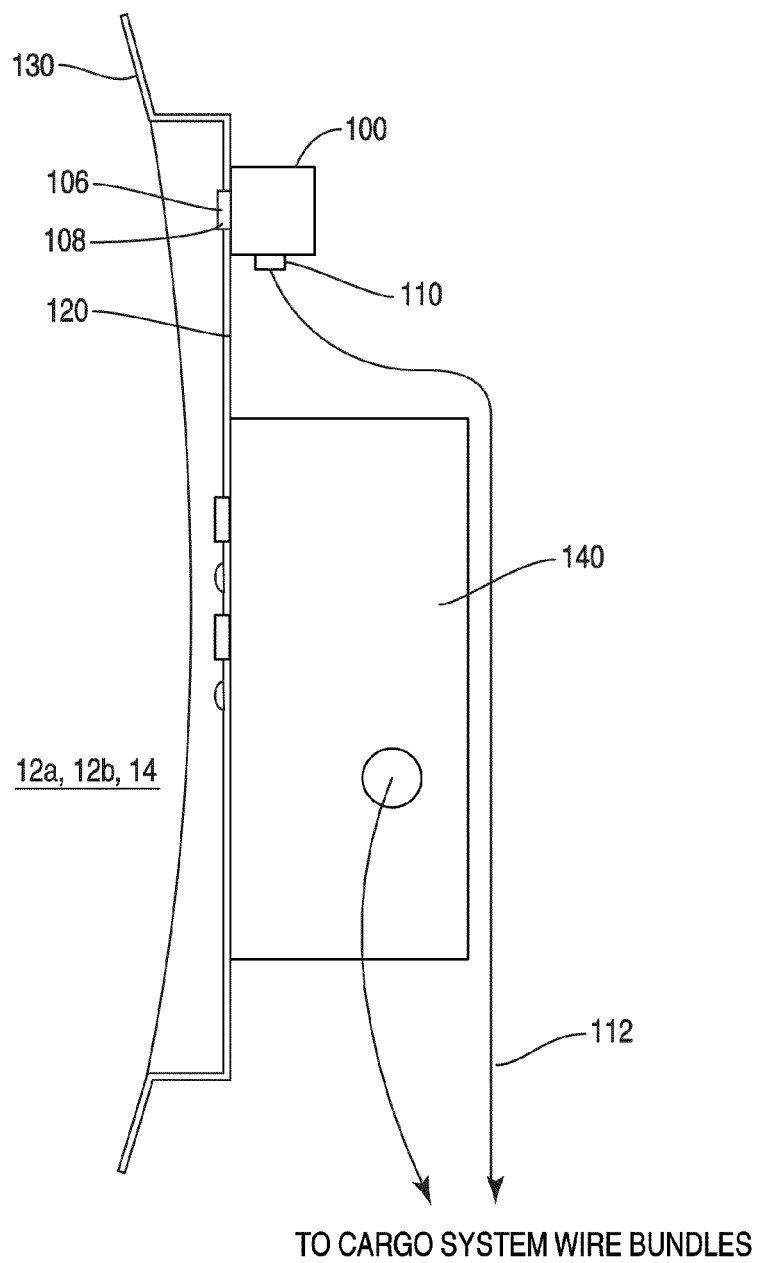
FIG. 15 is a cross sectional view showing a video camera installed in a typical aircraft MCP tub.

FIG. 15 shows one arrangement for mounting a camera 100 within a Master Control Panel ("MCP") tub 130 of a type commonly mounted along a sidewall of an aircraft cargo compartment 12a, 12b, 14. In this arrangement, a concealment panel 120 and camera 100 connected thereto are mounted to the MCP tub 130 above the MCP unit 140. The connector 110 of the camera 100 can be connected by a camera cable or cables 112 to a power source and/or one or more other system components as further described below. The camera 100 is electrically isolated from the MCP 140.

Figure 16:
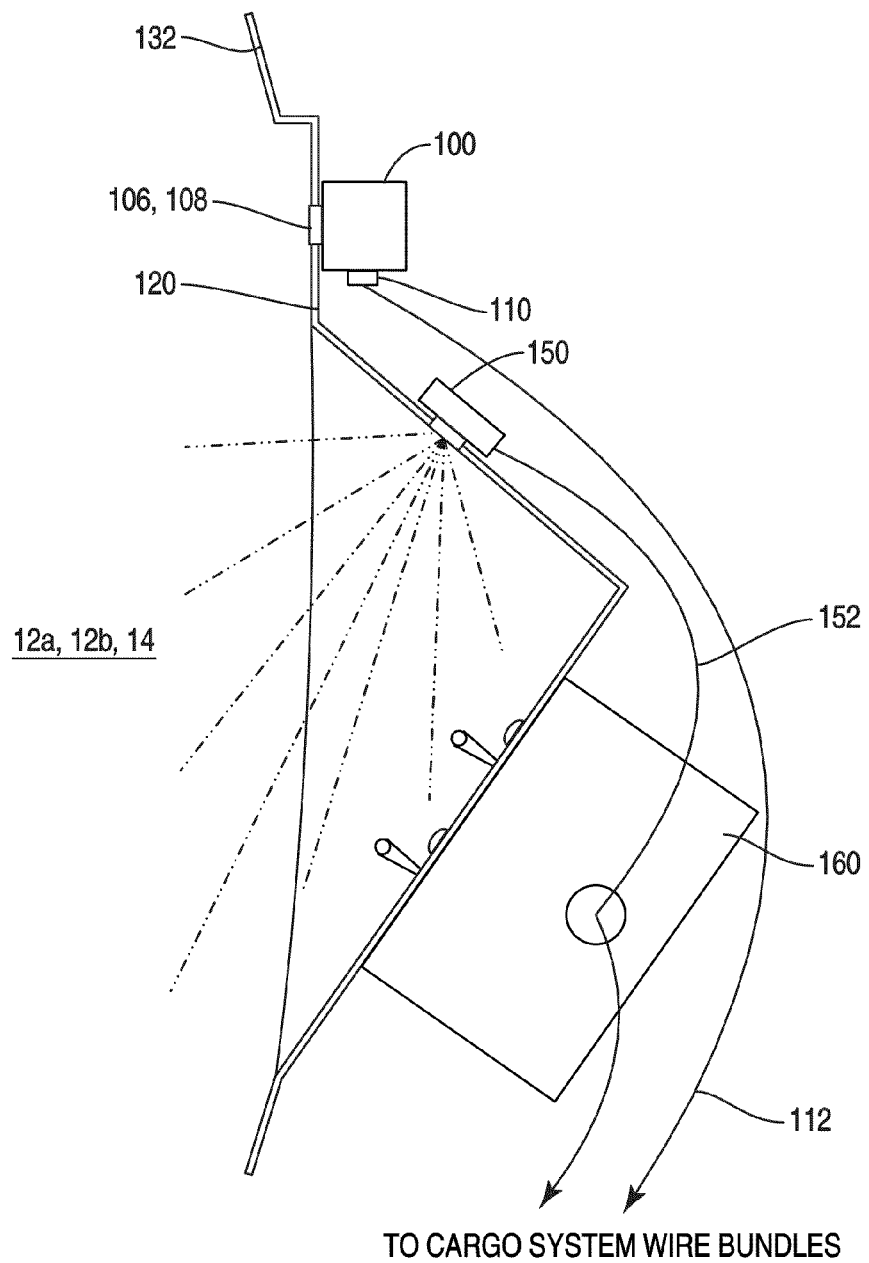
FIG. 16 is a cross sectional view showing a video camera installed in a typical aircraft LCP tub.
Figure 17:
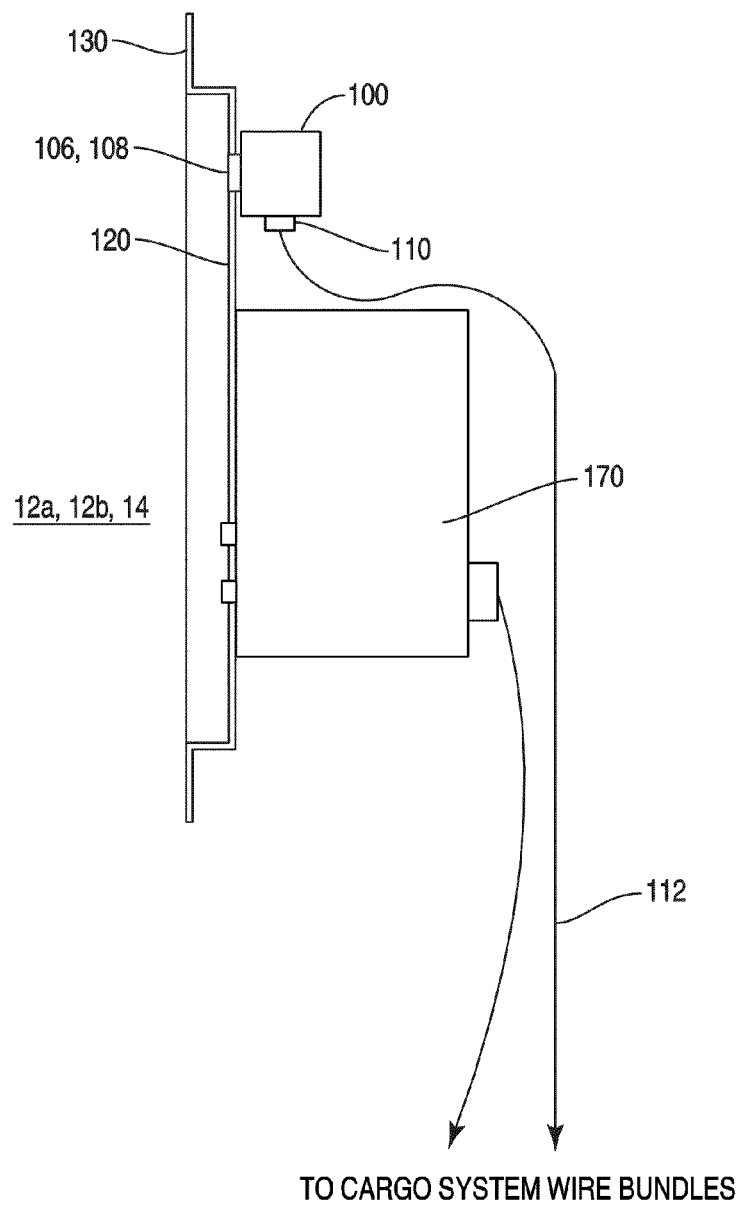
FIG. 17 is a cross sectional view showing a video camera installed in a typical aircraft lower lobe CMDU tub.

FIG. 16 shows one arrangement for mounting a camera 100 within a Local Control Panel ("LCP") tub 132 of a type commonly mounted along a sidewall of an aircraft cargo compartment 12a, 12b, 14. In this arrangement, a concealment panel 120 and camera 100 connected thereto are mounted to the LCP tub 132 above the LCP unit 160. As shown in FIG. 16, the camera 100 can be positioned proximate to a light source 150 connected to the LCP 160 by wires or cable 152. Again, the connector 110 of the camera 100 can be connected by a camera cable or cables 112 to a power source and/or one or more other system components as further described below. The camera 100 is electrically isolated from the LCP 160. Though not shown, the embodiment shown in FIG. 15 and described above may also include a light source like that shown in FIG. 16.

Figure 18:
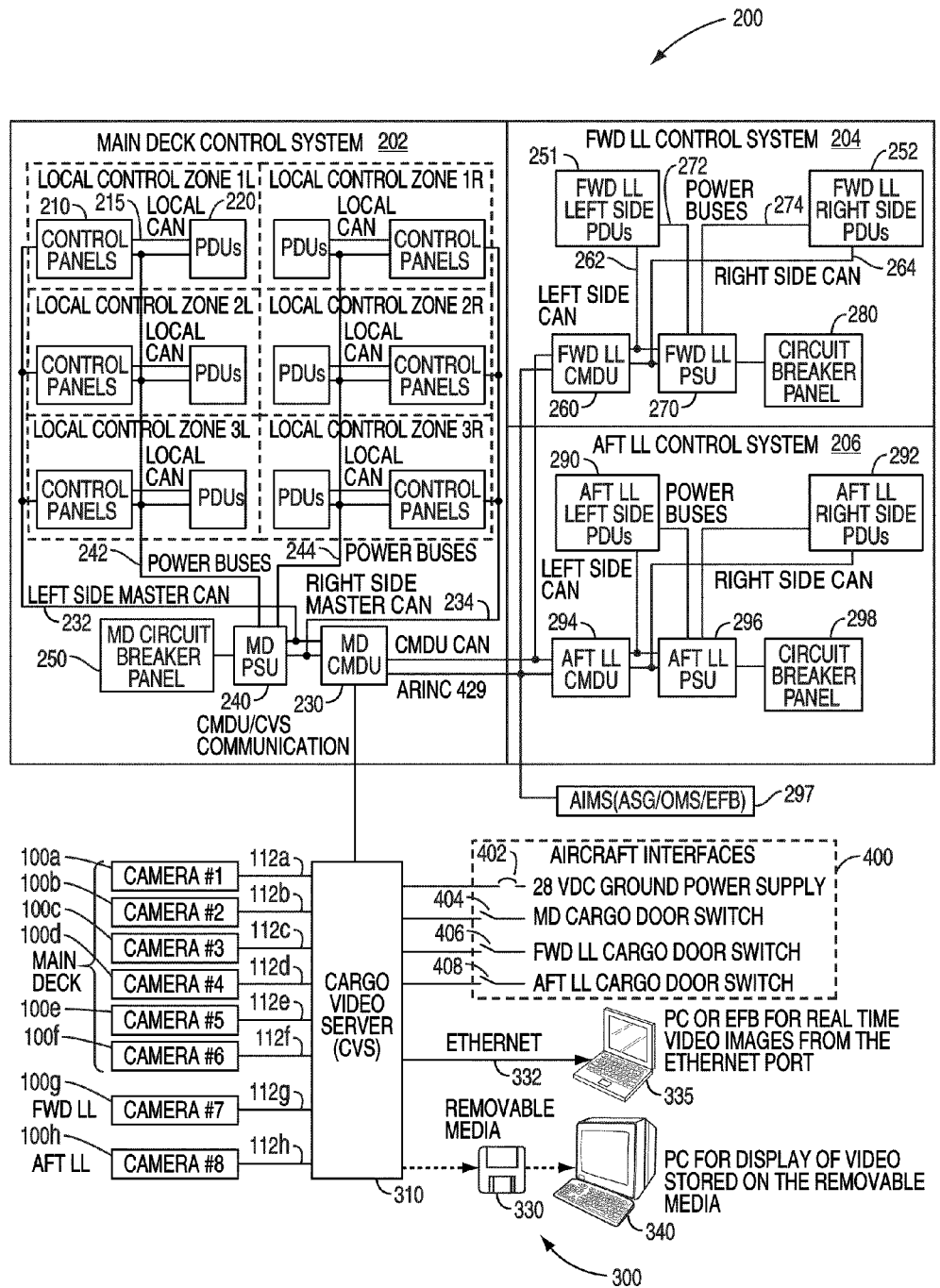
FIG. 18 is a block diagram showing one embodiment of an integrated cargo loading and cargo video monitoring system according to the invention.

FIG. 18 shows one arrangement of mounting a camera 100 within a Cargo Maintenance Display Unit ("CMDU") tub 134 of a type commonly mounted along a sidewall of an aircraft cargo compartment 12a, 12b, 14. In this arrangement, a concealment panel 120 and camera 100 connected thereto are mounted to the CMDU tub 134 above the CMDU unit 170. As described above, the connector 110 of the camera 100 can be connected by one or more camera cables 112 to a power source and/or one or more other system components as further described below. The camera 100 is electrically isolated from the CMDU 170.

FIG. 18 shows one embodiment of an integrated cargo loading and cargo video monitoring system 200 according to the invention. In this embodiment, the system 200 includes a main deck cargo control subsystem 202, a forward lower lobe cargo control subsystem 204, an aft lower lobe cargo control subsystem 206, and a cargo video monitoring/recording subsystem 300. In this embodiment, the cargo video monitoring/recording subsystem 300 includes eight cameras 100a-100h distributed about a main deck cargo compartment 14, a forward lower lobe cargo compartment 12a, and an aft lower lobe cargo compartment 12b like the camera placements shown in FIGS. 6, 9 and 10, for example. The cargo video monitoring/recording subsystem 300 also can include more or fewer cargo compartment cameras 100.

Figure 1:
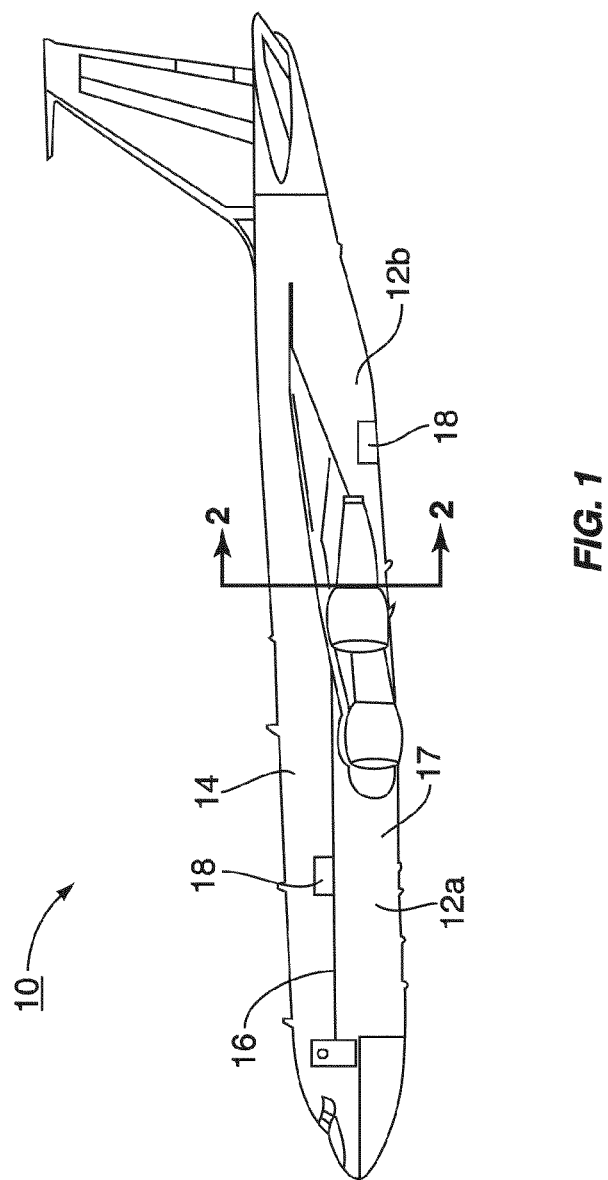
FIG. 1 is side view of a typical cargo aircraft showing the aircraft's cargo compartments.
Figure 2:
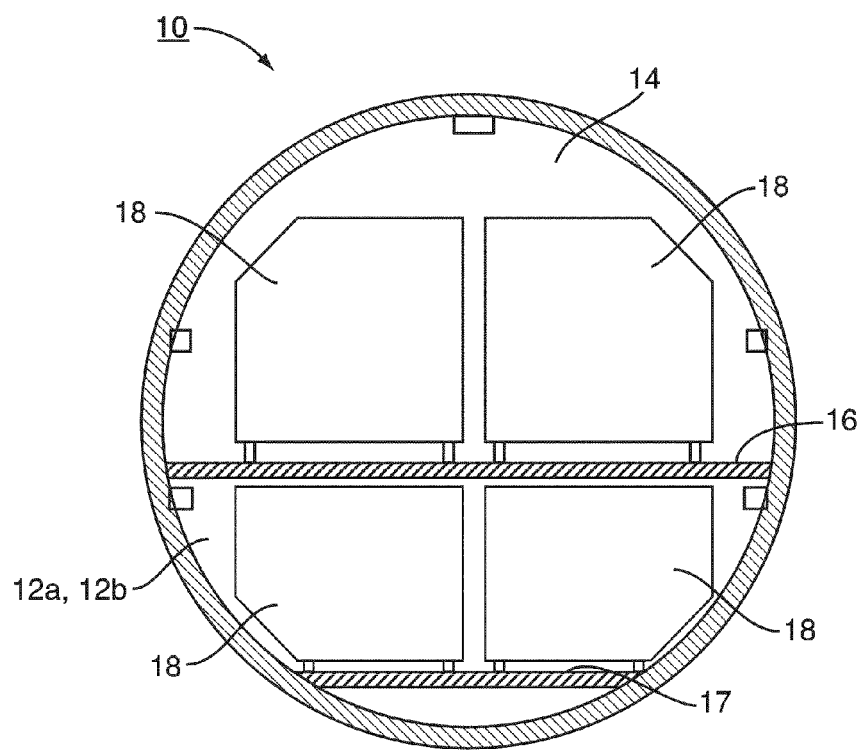
FIG. 2 is a cross sectional view of the aircraft shown in FIG. 1 taken along line 2-2 in FIG. 1.
Figure 3:
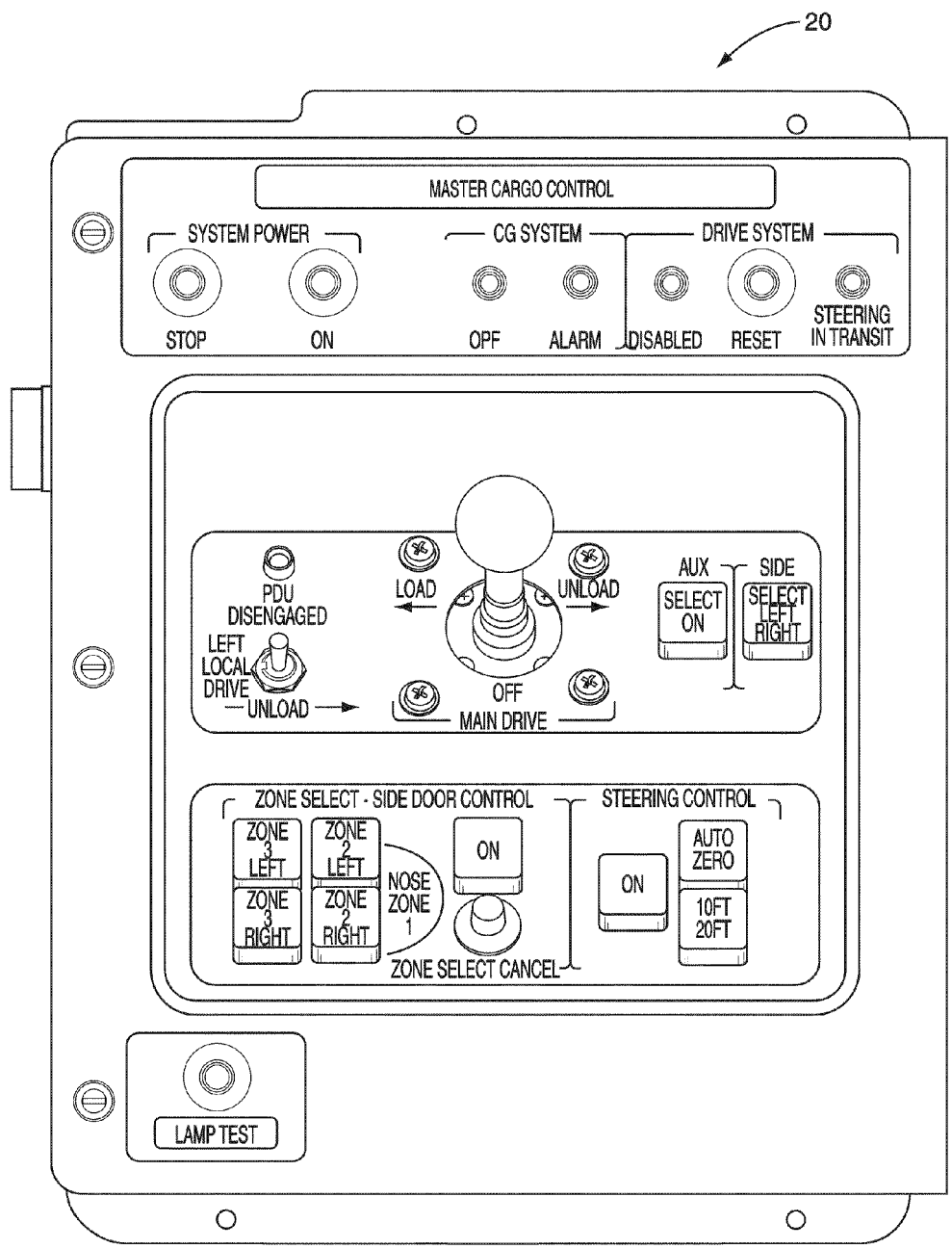
FIG. 3 is a front view of a typical aircraft Master Cargo Control panel.
Figure 4:
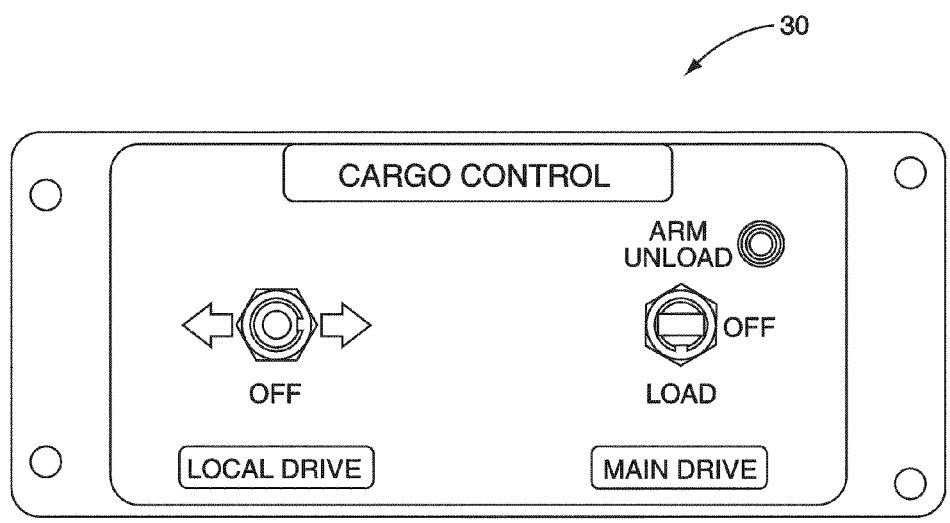
FIG. 4 is a front view of a typical aircraft Cargo Control Panel.

As shown in FIG. 18, the main deck cargo control subsystem 202 can include a plurality of PDUs 220 located within various zones on the main cargo deck. For example, in FIG. 18, the main deck cargo control subsystem 202 includes six local control zones. Each local control zone includes a plurality of local main deck PDUs 220 connected by a local controller area network ("CAN") 215 to a local main deck control panel 210. In this embodiment, each main deck PDU 220 and each main deck local control panel 210 is connected to and powered by a main deck Power Supply Unit ("PSU") 240 via power buses 242, 244. The main deck PSU 240 can be governed by a main deck circuit breaker 250. Each main deck local control panel 210 can be configured to permit selective control and operation of each main deck PDU 220 to which it is connected. In one embodiment, each main deck control panel 210 is coupled to a main deck Cargo Maintenance Display Unit ("CMDU") 230 that is configured to selectively display information relating to the operation and status of the main deck cargo control subsystem 202. The main deck CMDU 230 also is configured to permit selective control of each of the main deck local control panels 210 and main deck PDUs 220. The main deck CMDU 230 also is powered by the main deck PSU 240. The main deck CMDU 230 is located at a convenient location within the main deck cargo compartment 14. For example, the main deck CMDU 230 can be positioned proximate to a master cargo control panel 20 like that shown in FIG. 3.

As shown in FIG. 18, the integrated system 200 also includes a forward lower lobe cargo control subsystem 204. In the embodiment shown, subsystem 204 includes a plurality of left side forward lower lobe PDUs 251, and a plurality of right side forward lower lobe PDUs 252. The left and right side PDUs 251, 252 are respectively coupled to and controlled by a forward lower lobe CMDU 260 via left and right side CANs 262, 264. The forward lower lobe PDUs 251, 252 can be connected to and powered by a forward lower lobe PSU 270 via power buses 272, 274. The PSU 270 is governed by a forward lower lobe circuit breaker 280, and powers the forward lower lobe CMDU 260. The forward lower lobe CMDU 260 is operable to selectively control operation of the forward lower lobe PDUs 251, 252, and to selectively display information relating to the operation and status of the PDUs 251, 252.

As also shown in FIG. 18, the aft lower lobe cargo control subsystem 206 can be similarly configured to the forward lower lobe cargo control subsystem 204 described above. The aft lower lobe cargo control subsystem 206 can include left and right side aft lower lobe PDUs 290, 292, an aft lower lobe CMDU 294, an aft lower lobe PSU 296, and an aft lower lobe circuit breaker 298. The aft lower lobe CMDU 294 is operable to selectively control operation of the aft lower lobe PDUs 290, 292, and to selectively display information relating to the operation and status of the PDUs 290, 292.

As also shown in FIG. 18, each of the main deck and lower lobe CMDUs 240, 260, 294 can be coupled to an airplane information management system ("AIMS") 297, such as by an ARINC 429 data bus interface 292 or the like. The AIMS 297 can be a permanent portion of the aircraft, such as an Onboard Maintenance System ("OMS"), or can be a portable electronic flight bag (EFB). The system 200 also can include one or more additional communication interfaces, such as an ARINC Signal Gateway ("ASG"), or the like. The AIMS 297 can enable authorized persons with access to an aircraft's information systems and who are remote from the aircraft's CMDUs to remotely monitor an aircraft's cargo compartments. For example, the AIMS 297 can enable a flight crew to visually monitor the condition of a cargo compartment before, during or after flight, such that appropriate action, if any, can be taken.

FIG. 18 also shows a cargo video monitoring and recording subsystem 300 integrated with the cargo control subsystems 202, 204, 206 described above. As shown in FIG. 18, the video subsystem 300 includes a cargo video server ("CVS") 310 coupled to the main deck CMDU 230. A plurality of video cameras 100a-100h each are respectively connected to the CVS 310 by a plurality of video cables or wires 112a-112h. For example, the six main deck cameras 100a-100f shown in FIG. 18 can correspond to the six main deck cameras 100a-100h depicted in FIG. 6, and the two lower lobe cameras 100g, 100h shown in FIG. 18 can correspond to the two lower lobe cameras 100g, 100h depicted in FIGS. 9 and 10. Preferably, the system 200 is configured such that the cargo video monitoring and recording subsystem 300 can be powered and operational even when the cargo control subsystems 202, 204, 206 are off. Preferably, the video subsystem 300 consumes not more than about 50 Watts of power.

The CVS 310 also can be connected to one or more aircraft interfaces 400, such as to a ground power supply 402, a main cargo door switch 404, a forward lower lobe cargo door switch 406, and an aft lower lobe cargo door switch 408. The cargo door switches 404, 406, 408 can be configured to signal the CVS 310 to activate one or more of the video cameras 100a-100h only when a cargo door associated with a camera's cargo compartment is open. Alternatively, the CVS 310 can be activated by other types of automated sensors for detecting activity within a cargo compartment, such as by motion detectors, aircraft wheel weight sensors, or the like. The CVS 310 can include an Ethernet connection 332 for connecting the CVS 310 to a portable computer or electronic flight bag ("EFB") 335, or to another electronic device capable of receiving video outputs from the CVS 310. In addition, the CVS 310 preferably is capable of recording video information on removable storage media 330 so that video image files can be saved and played later on a remote video-playing device, such as a PC 340.

Because the CVS 310 is coupled to the main deck CMDU 230 and the main deck CMDU 230 is in turn coupled to the forward and aft lower lobe CMDUs 260, 294, video signals received by the CVS 310 from any one of the main deck or lower lobe cargo compartment cameras 100a-100h can be selectively viewed on any of the cargo compartment CMDUs 230, 260, 294. Thus, the integrated cargo loading and video monitoring/recording system 200 permits a person or persons charged with supervising and controlling the loading or unloading of cargo onto/from an aircraft to: 1) control cargo loading/unloading activities from a single location: 2) monitor cargo loading/unloading activities from such location; and 3) view cargo compartment activities during cargo loading and unloading in real time from such location. In addition, if cargo is altered, damaged or missing, the system 200 provides recorded video evidence of substantially all loading and unloading activities within a particular cargo compartment, thereby permitting cargo carriers to better ascertain the cause or potential cause of such altered, damaged or missing cargo.

Figure 19:
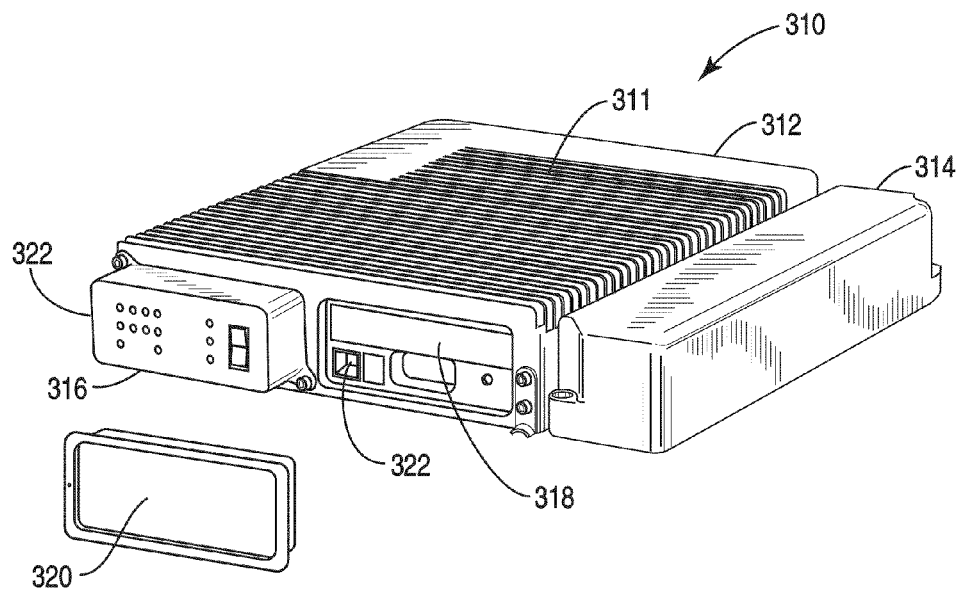
FIG. 19 is a perspective view of one embodiment of a cargo video server for use in the system shown in FIG. 19.
Figure 20:
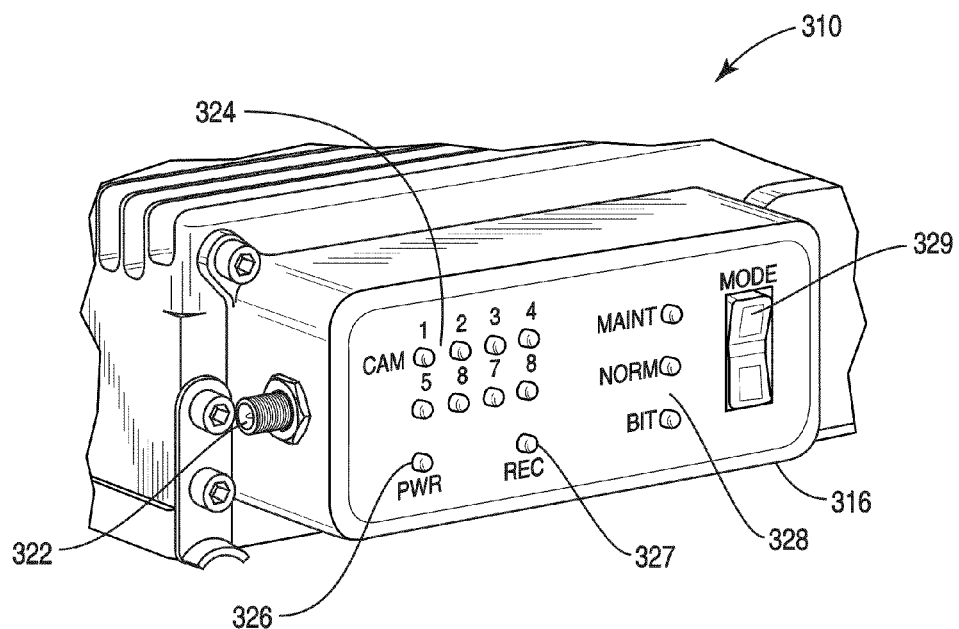
FIG. 20 is a perspective view of a control panel portion of the cargo video server shown in FIG. 19.

One embodiment of CVS 310 for use in the integrated system 200 described above is shown in FIGS. 19 and 20. As shown in FIG. 20, the CVS 310 can include a housing 312, and optionally can include a backup battery 314. The housing 312 may include a plurality of external cooling fins 311 to passively dissipate internally generated heat, and to eliminate the need for a power-consuming cooling fan. The front of the CVS 310 can include an integral control panel 316. The CVS 310 also can include an Ethernet port 332 (such as 100 Base-T Ethernet 4x), and a removable hard drive 318 or other removable storage medium 330 for storing video image data. Preferably, the storage media 318, 330 includes non-volatile memory capable of storing at least about 100 hours of recorded video data. For example, the removable hard drive 318 can have at least about 40 GB of non-volatile memory. Preferably, the hard drive 318 is a ruggedized, extended-temperature hard drive that is mounted within a sealed protective housing. Alternatively, the storage media 318, 330 can be any other type of storage device having adequate storage capacity and durability. In one embodiment, the CVS 310 records video data in motion JPEG format. The CVS 310 also may include a flash memory card, such as a 16 GB flash PC card or the like (not shown in FIGS. 19 and 20). A removable access cover 320 can selectively cover the hard drive 318 and Ethernet port 332. The CVS 310 also can include one or more external antennae connections 322 for use in wirelessly receiving and sending data or other information.

The CVS 310 can be equipped with a Pentium® M 1.6 GHz processor and have about one GB of internal memory. The CVS 310 can have up to about 1600×1200 LVDS video output, and accept eight or more NTSC video inputs. The CVS 310 also can include two or more NTSC video outputs. In one embodiment, the CVS 310 is operational between about −15 degrees C. and about +55 degrees C., and conforms to all applicable portions of RTCA/DO-160.

As shown in FIG. 20, the CVS control panel 316 can include a plurality of camera indicator lights 324, a power indicator light 326, a record indicator light 327, and/or one or more other status indicator lights 328. A mode switch 29 can be provided for selecting a desired mode of operation of the CVS 310. For example, the mode switch 29 may operable to selectively switch operation of the CVS 310 between a maintenance mode, a normal mode, and a built-in test equipment ("BITE") mode.

Figure 21B:
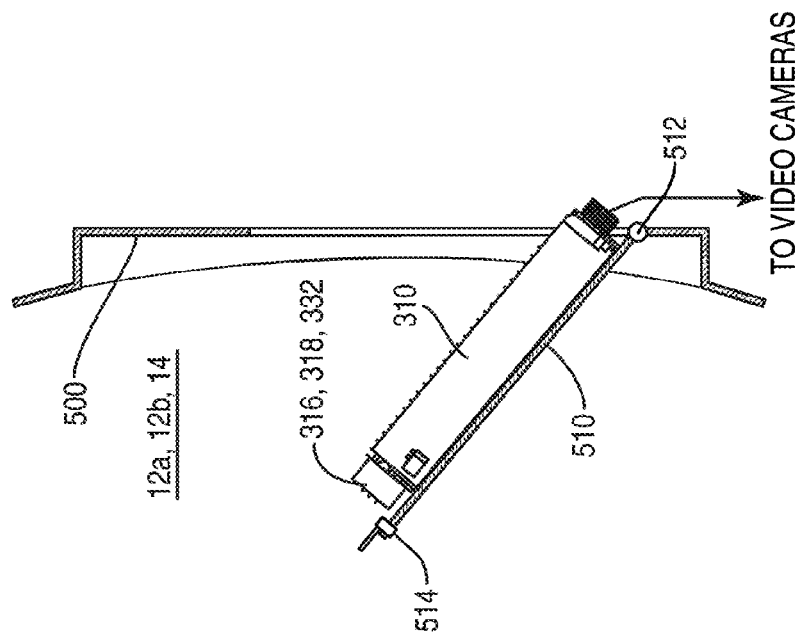
FIGS. 21A and 21B are cross-sectional views showing one installation of a cargo video server like that shown in FIGS. 19 and 20 in a sidewall of an aircraft cargo compartment.
Figure 21A:
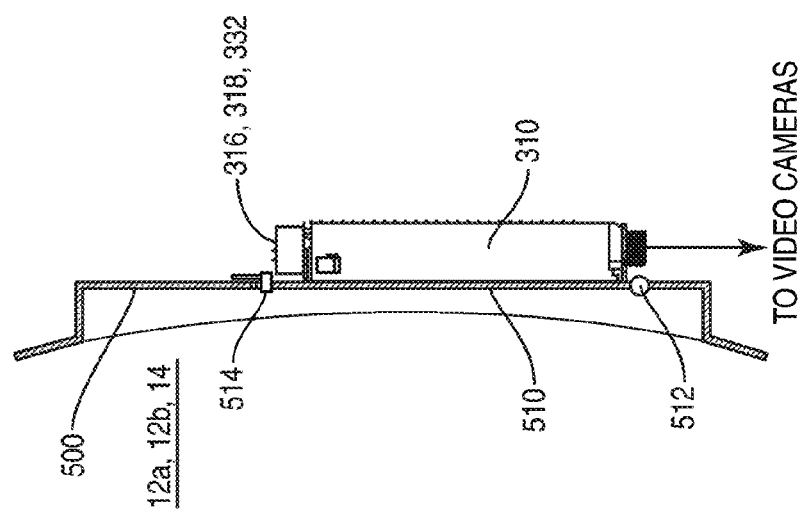

As shown in FIGS. 21A and 21B, the CVS 310 can be mounted to an interior surface of a movable panel 510 mounted to a tub 500 on an interior surface of a aircraft cargo compartment 12a, 12b or 14. For example, the CVS 310 can be located on a sidewall of a cargo compartment at a location that minimizes the distance between the CVS 310 and the most distant camera(s) 100. The movable panel 510 may be pivotally connected to the tub 500 by one or more hinges 512 such that the CVS 310 is stored away from view behind the panel 510 when the panel 510 is closed, and the control panel 316, removable storage media 318, and Ethernet connection 332 can selectively be accessed when the panel 510 is open. Preferably, the movable panel 510 substantially hides the CVS 310 such that unauthorized persons cannot access the CVS 310 or removable storage media 318. As shown in FIGS. 21A and 21B, the panel 510 may include one or more locks to further prevent unauthorized access to the CVS 310.

Figure 22:
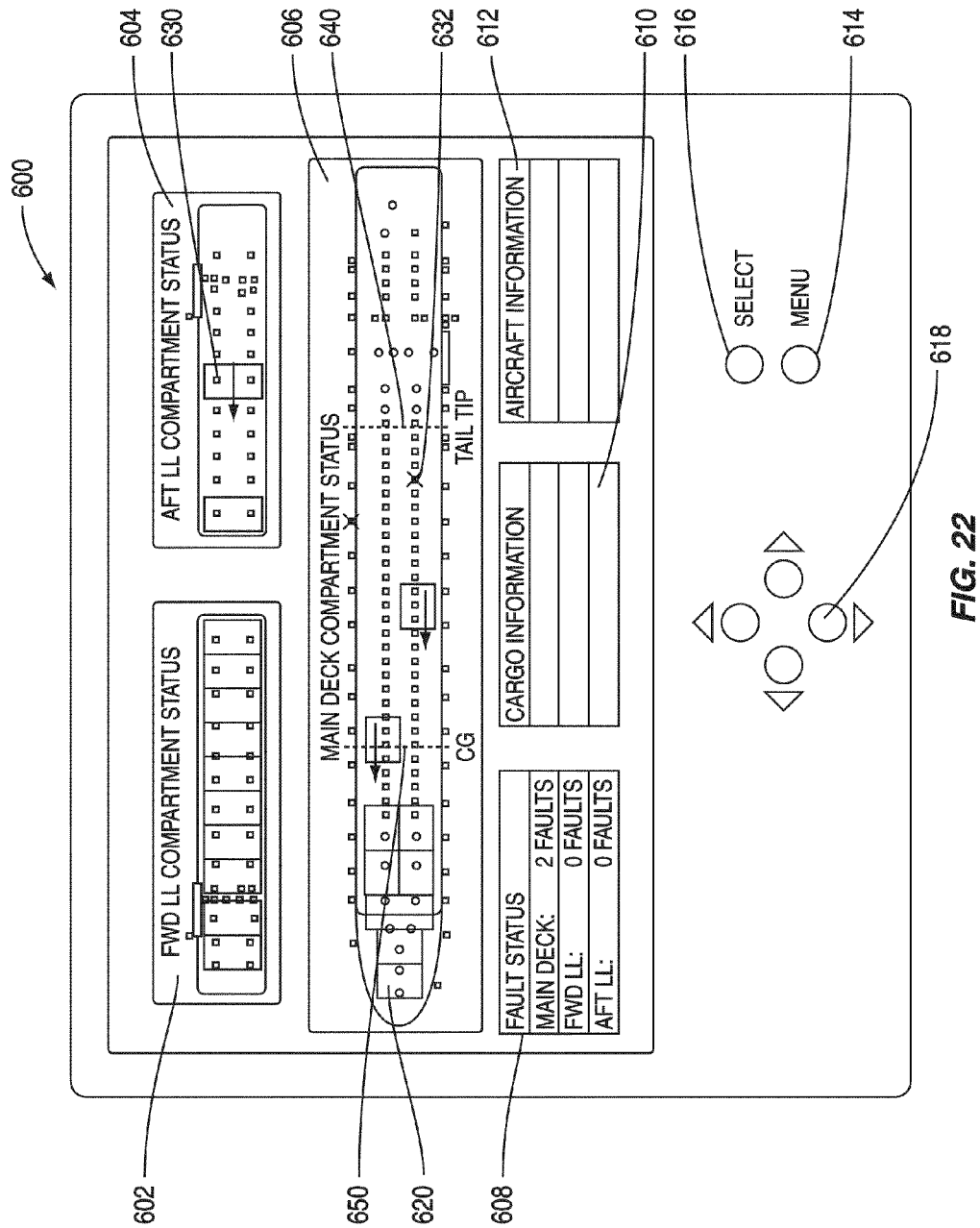
FIG. 22 is a front view of a cargo control display screen.
Figure 23:
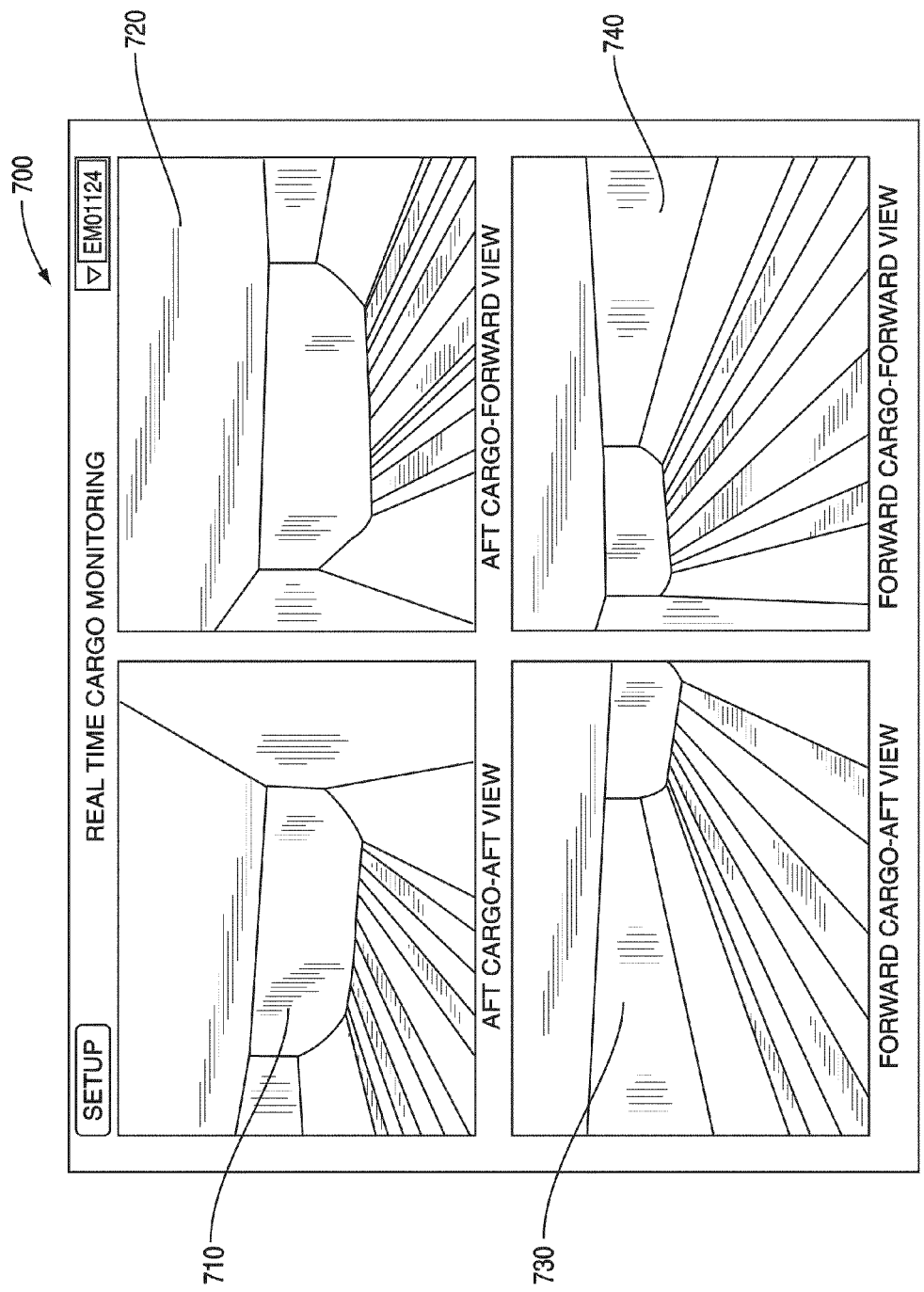
FIG. 23 is a front view of a cargo video display screen.

FIG. 23 shows one embodiment of a CMDU display screen 600 that may be selectively displayed on the main deck CMDU 230, forward lower lobe CMDU 260, and/or aft lower lobe CMDU 294 to display real-time status within the cargo compartments. As shown in FIG. 22, the display screen 600 can include simultaneous graphical representations of a main deck compartment 606, a forward lower lobe compartment 602, and an aft lower lobe compartment 604. The display may include graphic representations of one or more ULDs 620 that have been fully loaded in a particular cargo compartment, and may include graphic representations of the locations and directions of one or more ULDs 630 that presently are being moved to or from a stowage location within a particular cargo compartment. The cargo control portions 202, 204, 206 of the integrated system 200 can include one or more ULD-sensing PDUs to sense and track the current location of a particular ULD within an aircraft cargo compartment 12a, 12b, 14. For example, the system 200 can include one or more ULD-sensing PDUs as described in U.S. Pat. No. 6,834,758 to Goodrich Corporation.

In one embodiment, a particular ULD can be automatically identified to the system 200 as the ULD enters a cargo compartment 12a, 12b, 14. For example, each ULD can include a unique barcode identification tag that is scanned by a barcode reader as the ULD enters a cargo compartment 12a, 12b, 14, and the detected identification information (such as a unique ULD identification number) and other information specific to the identified ULD (such as ULD contents, ULD weight, cargo compartment location, and the like) can be communicated to the system 200 by the barcode reader. Alternatively, each ULD can include an RFID tag with stored ULD identity information and other ULD information that is operable to communicate the ULD information to the system 200 via an RFID reader. For example, the identity, location, and characteristics of a tagged ULD can be initially detected by an RFID reader as the tagged ULD enters a cargo compartment 12a, 12b, 14, and can be communicated to the system 200 by the RFID reader. In one embodiment, the system can include a RFID identification and tracking system like that described in published U.S. Patent Application No. 2006/0038077 A1, assigned to Goodrich Corporation. In such a system 200, RFID readers can be positioned within each cargo compartment 12a, 12b, 14 to detect the identities, real-time locations, and characteristics of tagged ULDs as the ULDs are loaded or unloaded from an aircraft's cargo compartment 12a, 12b, 14.

As shown in FIG. 23, the CMDU display screen 600 can display include other graphic representations, such as the location of a faulty or inactive PDU 632, an indication of a current "tail tip" boundary 640 beyond which ULDs should not be moved, an indication of a current aircraft center of gravity ("CG") 650 based on the positions of currently stowed ULDs, and the like. In order to display the tail-tip and CG information, the system can be coupled to an automated aircraft weight and balance system of a type known to persons of ordinary skill in the art. An aircraft's weight and balance can be calculated by the system by sensing each ULD's size using barcode or RFID sensors like those described above, and determining the associated maximum or actual weight of each sensed ULD. Other types of automatic sensors also can be used, including weight sensors, and the like, and ULD position sensors like those described in U.S. Pat. No. 7,198,227. Accordingly, the control system can calculate or closely approximate the aircraft's weight and center of gravity 650 based on the location, size and corresponding maximum or actual weight of each detected ULD. The compartment loads for the main deck and both lower lobe compartments can be calculated while loading or unloading an aircraft, and as each ULD travels between a doorway and its stowed location. Thus, the system can dynamically determine current tail-tip and CG conditions during loading and unloading operations based on real-time information, and can display such real-time information on the CMDU display screen 600.

In addition, the display 600 can include other current information regarding equipment fault status 608, other cargo information 610, other aircraft information 612, and the like. In one embodiment, one or more of the cargo compartment CMDUs 230, 260, 294 can include a touch screen operable to detect touch commands from a user. As shown in FIG. 22, the display screen 600 can include a touch screen menu "button" for selecting a menu of user options, a touch screen select "button" for selecting a particular user option, a series of navigation "buttons" 618 for moving a cursor or navigating a menu, and the like.

FIG. 23 shows another embodiment of a CMDU display screen 700 that may be selectively displayed on the main deck CMDU 230, forward lower lobe CMDU 260, and/or aft lower lobe CMDU 294 to display real-time video images of one or more of an aircraft's various cargo compartments. In the display 700 shown in FIG. 23, the display 700 includes four real time video images, including: 1) an aft view 710 of an aft lower lobe cargo compartment; 2) a forward view 720 of an aft lower lobe cargo compartment; 3) an aft view 730 of a forward lower lobe cargo compartment; and 4) a forward view of a forward lower lobe cargo compartment. Of course, a system 200 according to the invention can be configured to selectively display substantially any single video image or any combination of video images from any one of its video cameras 100. In addition, as shown in FIG. 24, the system 200 can be configured to display a screen 800 that includes a combination of one or more video images 810, one or more graphical cargo information displays 820, and one or more navigation buttons 830.

Figure 24:
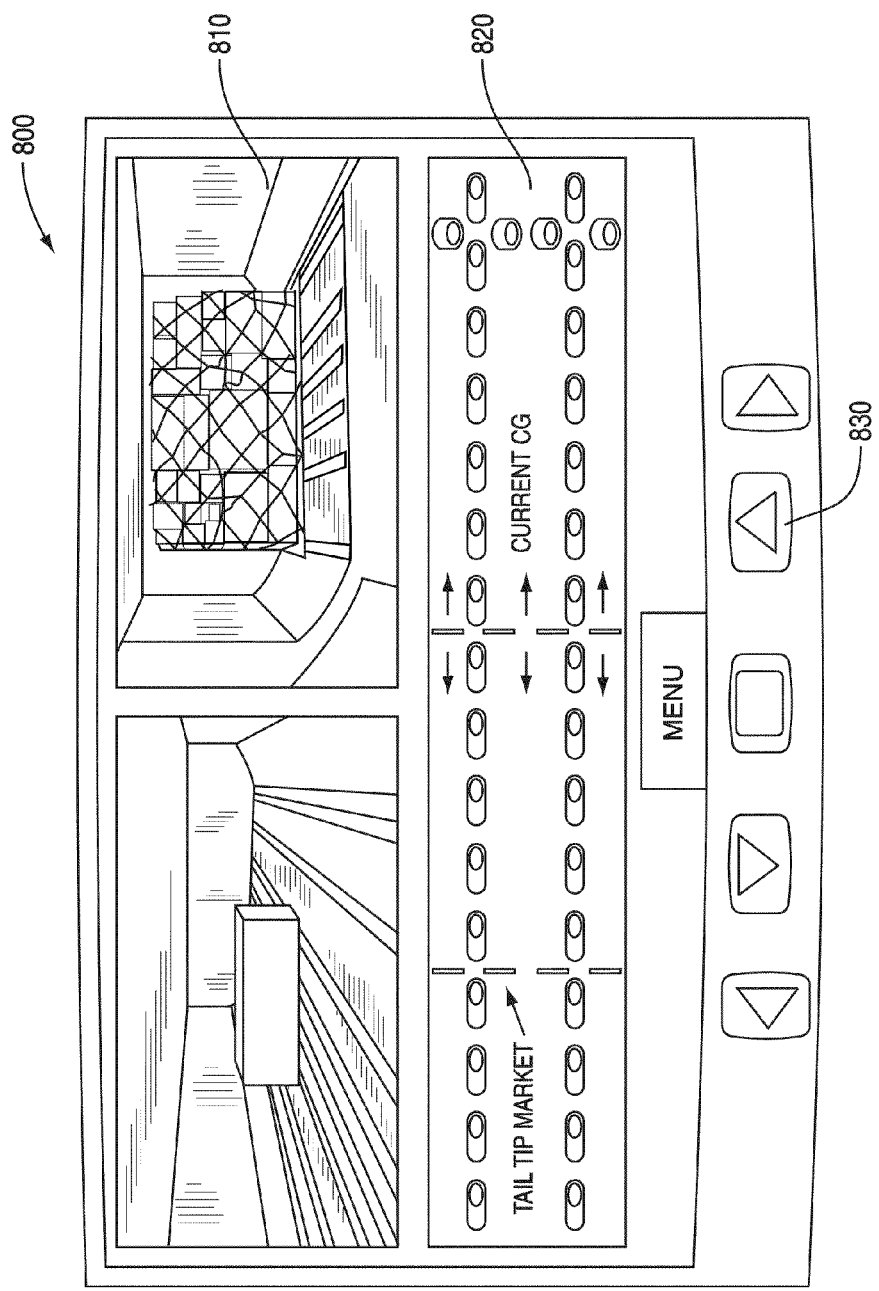
FIG. 24 is a front view of a display screen that shows both cargo video images and cargo loading information.

FIG. 24 shows one embodiment of a video display screen 800 presented on a remote ground-based device, such as a personal computer 340. The computer 340 can include compatible software to enable it to display video data recorded by the CVS 310. For example, the video display screen 800 shown in FIG. 24 is being played from a removable storage medium 330 on which video data has been recorded by the CVS 310. As shown in FIG. 24, an integrated system 200 according to the invention can enable a person to selectively review recorded video data from a particular cargo compartment at a particular time for the occurrence of a particular activity or event. The video display screen 800 can include pertinent information such as the identity of an associated aircraft 810, the date 812 and time 814 of a particular video recording, one or more other corresponding cargo compartment video images 816, and one or more touch screen video control "buttons" 818 for navigating a video recording, or the like.

Figure 25:
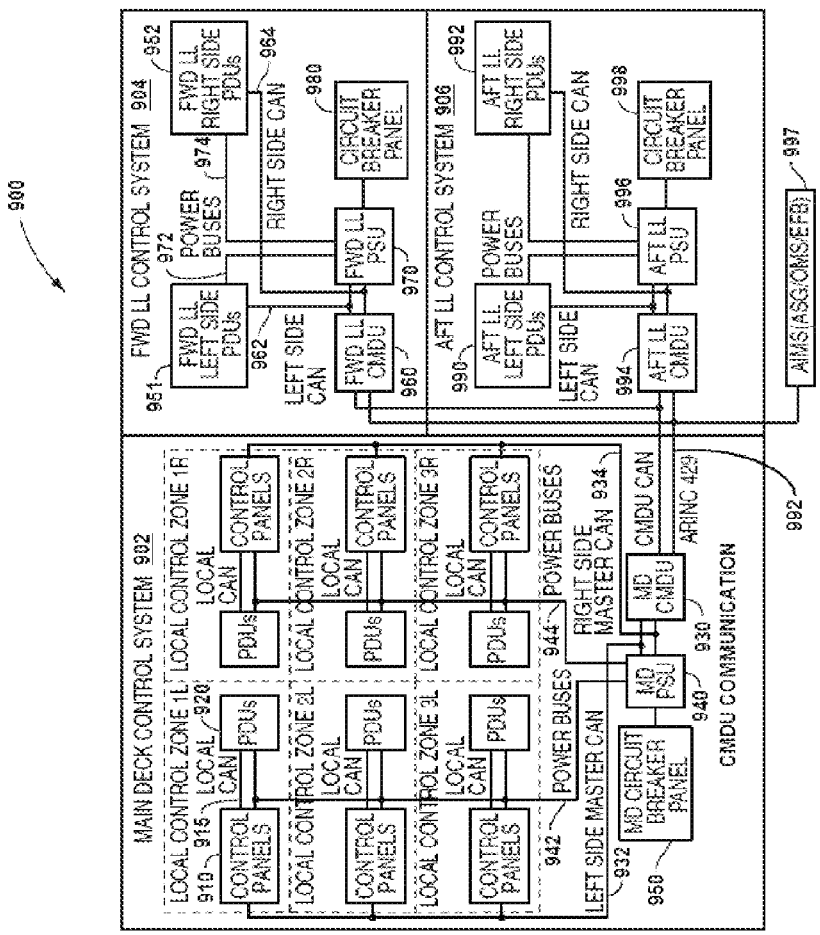
FIG. 25 is a block diagram showing one embodiment of an integrated cargo loading and monitoring system according to the invention.

FIG. 25 shows another embodiment of an integrated cargo loading and monitoring system 900 according to the invention. In this embodiment, the system 900 includes a main deck cargo control subsystem 902, a forward lower lobe cargo control subsystem 904, and an aft lower lobe cargo control subsystem 906. In this embodiment, the cargo loading and monitoring system 900 does not include a cargo video monitoring/recording system. The main deck cargo control subsystem 902 can include a plurality of PDUs 920 located within various zones on the main cargo deck. For example, in FIG. 25, the main deck cargo control subsystem 902 includes six local control zones, including local control zones 1L-3R. Each local control zone can include a plurality of local main deck PDUs 920 connected by a local controller area network ("CAN") 915 to a local main deck control panel 910. In this embodiment, each main deck PDU 920 and each main deck local control panel 910 can be connected to and powered by a main deck Power Supply Unit ("PSU") 940 via power buses 942, 944. The main deck PSU 940 can be governed by a main deck circuit breaker 950. Each main deck local control panel 910 can be configured to permit selective control and operation of each main deck PDU 920 to which it is connected. In one embodiment, each main deck control panel 910 is coupled to a main deck Cargo Maintenance Display Unit ("CMDU") 930 that is configured to selectively display information relating to the operation and status of the main deck cargo control subsystem 902. The main deck CMDU 930 also can be configured to permit selective control of each of the main deck local control panels 910 and main deck PDUs 920. The main deck CMDU 930 also can be powered by the main deck PSU 940. The main deck CMDU 930 can be located at a convenient location within a main deck cargo compartment. For example, the main deck CMDU 930 can be positioned adjacent to a master cargo control panel 20 like that shown in FIG. 3.

As also shown in FIG. 25, the integrated cargo loading and monitoring system 900 can also include a forward lower lobe cargo control subsystem 904. In the embodiment shown, subsystem 904 includes a plurality of left side forward lower lobe PDUs 951, and a plurality of right side forward lower lobe PDUs 952. The left and right side PDUs 951, 952 are respectively coupled to and controlled by a forward lower lobe CMDU 960 via left and right side CANs 962, 964. The forward lower lobe PDUs 951, 952 can be connected to and powered by a forward lower lobe PSU 970 via power buses 972, 974. The PSU 970 is governed by a forward lower lobe circuit breaker 980, and powers the forward lower lobe CMDU 960. The forward lower lobe CMDU 960 is operable to selectively control operation of the forward lower lobe PDUs 951, 952, and to selectively display information relating to the operation and status of the PDUs 951, 952.

The aft lower lobe cargo control subsystem 906 can be similarly configured to the forward lower lobe cargo control subsystem 904 described above. The aft lower lobe cargo control subsystem 906 can include left and right side aft lower lobe PDUs 990, 992, an aft lower lobe CMDU 994, an aft lower lobe PSU 996, and an aft lower lobe circuit breaker 998. The aft lower lobe CMDU 994 can be operable to selectively control operation of the aft lower lobe PDUs 990, 992, and to selectively display information relating to the operation and status of the PDUs 990, 992.

As also shown in FIG. 25, each of the main deck and lower lobe CMDUs 940, 960, 994 can be coupled to an airplane information management system ("AIMS") 997, such as by an ARINC 429 data bus interface 992 or the like. The AIMS 997 can be a permanent portion of the aircraft, such as an Onboard Maintenance System ("OMS"), or can be a portable electronic flight bag (EFB). The system 900 also can include one or more additional communication interfaces, such as an ARINC Signal Gateway ("ASG"), or the like. The AIMS 297 can enable authorized persons with access to an aircraft's information systems and who are remote from the aircraft's CMDUs to remotely monitor an aircraft's cargo compartments. The integrated cargo loading and monitoring system 900 can interface with an aircraft's Central Maintenance Computer for reporting faults involving PDUs or monitoring system components.

Figure 26:
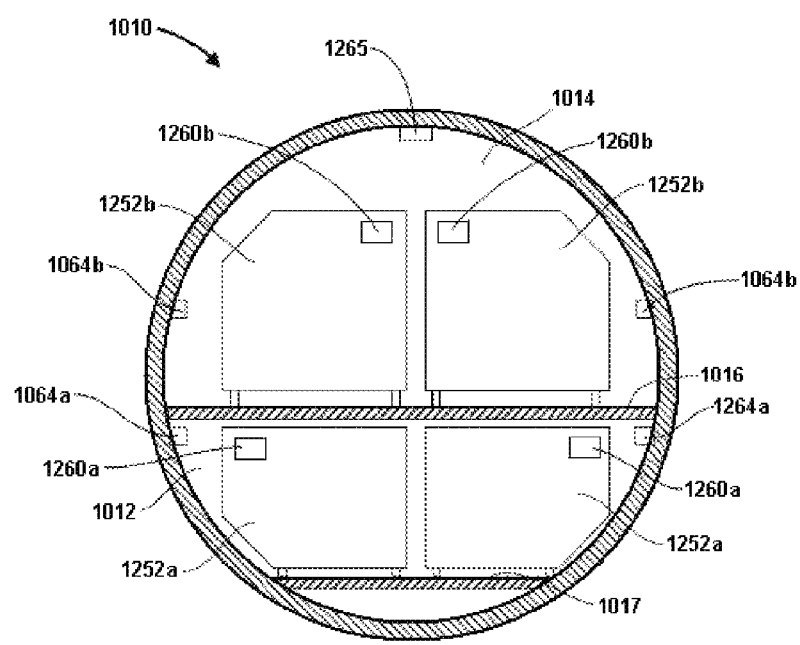
FIG. 26 is a cross section of an aircraft showing cargo containers with radio frequency identification tags and a plurality of radio frequency identification readers disposed about the aircraft's cargo compartments.

In one embodiment, ULDs can be automatically identified to the integrated cargo loading and monitoring system 900 as the ULDs enter and move through an aircraft cargo compartment. FIG. 26 shows a cross-section of an cargo aircraft 1010 loaded with a plurality of ULDS 1252a, 1252b. As seen in FIG. 26, two cargo floors or decks 1016, 1017 respectively support ULDs 1252a, 1252b in an upper cargo compartment 1014 and a lower cargo compartment 1012. ULDs 1252a in the lower cargo compartment 1012 bear wireless RFID tags 1260a which are readable by a plurality of long-range RFID readers 1064a positioned along side walls of the compartment 1012. Similarly, ULDs 1252b in the upper cargo compartment 1014 bear wireless RFID tags 1260b which are readable by a plurality of long-range RFID readers 1064b spaced along side walls of the upper cargo compartment 1014 and by one or more overhead RFID readers 1065 on the ceiling of the cargo compartment 1014.

Figure 27:
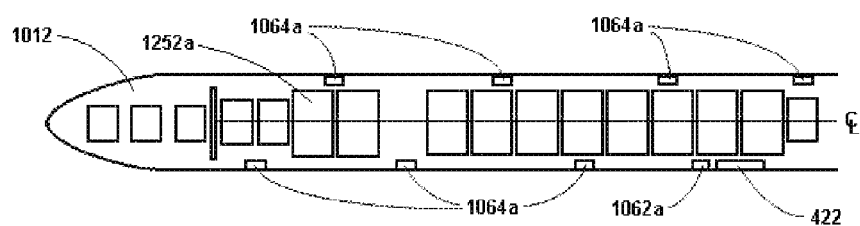
FIG. 27 is a plan view of a lower cargo compartment of an aircraft.
Figure 28:
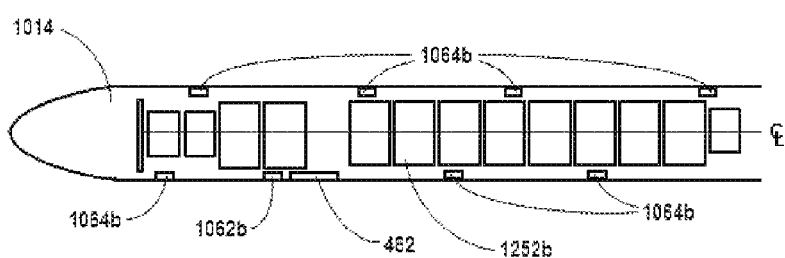
FIG. 28 is a plan view of an upper cargo compartment of an aircraft.

FIGS. 27 and 28 show plan views of the ULDs 1252a, 1252b loaded in the lower cargo compartment 1012 and the upper cargo compartment 1014, respectively. In this arrangement, the lower cargo compartment 1012 has a first short-range doorway reader 1062a located adjacent to a lower cargo door 1022, and the upper cargo compartment 1014 has a second short-range doorway reader 1062b near the upper cargo door 1082. In addition, a plurality of long-range RFID readers 1064a, 1064b are spaced along the side walls of the two cargo compartments 1012, 1014. Preferably, the long range readers 1064a, 1064b are no more than about 50 to 70 feet apart along a single side wall. In addition, the long-range readers 1064a, 1064b on one side wall can be staggered relative to the long-range readers 1064a, 1064b on the opposed side wall. Staggering the long-range RFID readers 1064a, 1064b in this way can help ensure that a wireless tag 1260a, 1260b on a ULD 1252a, 1252b can be read by at least three different long-range RFID readers 1064a, 1064b at any location within the cargo compartments 1012, 1014.

The RFID tag 1260a, 1260b on each ULD 1252a, 1252b shown in FIG. 26 can include stored data which is pertinent to its associated ULD 1252a, 1252b. Such data can include identity information, type or size information, weight information, or any other information that is specific to an associated ULD 1252a, 1252b. The RFID tags 1260a, 1260b are configured to communicate such ULD information to the RFID readers 1062a, 1062b, 1064a, 1064b and 1065 when scanned by the readers as the associated ULDs occupy or move through locations within the cargo compartments 1012, 1014. As discussed below, the RFID readers 1062a, 1062b, 1064a, 1064b and 1065 can be coupled to an integrated cargo loading and monitoring system 900 like that described above, and can be operable to communicate ULD information received from responding RFID tags 1260a, 1260b to a Cargo Maintenance Display Unit ("CMDU") 930.

Figure 29:
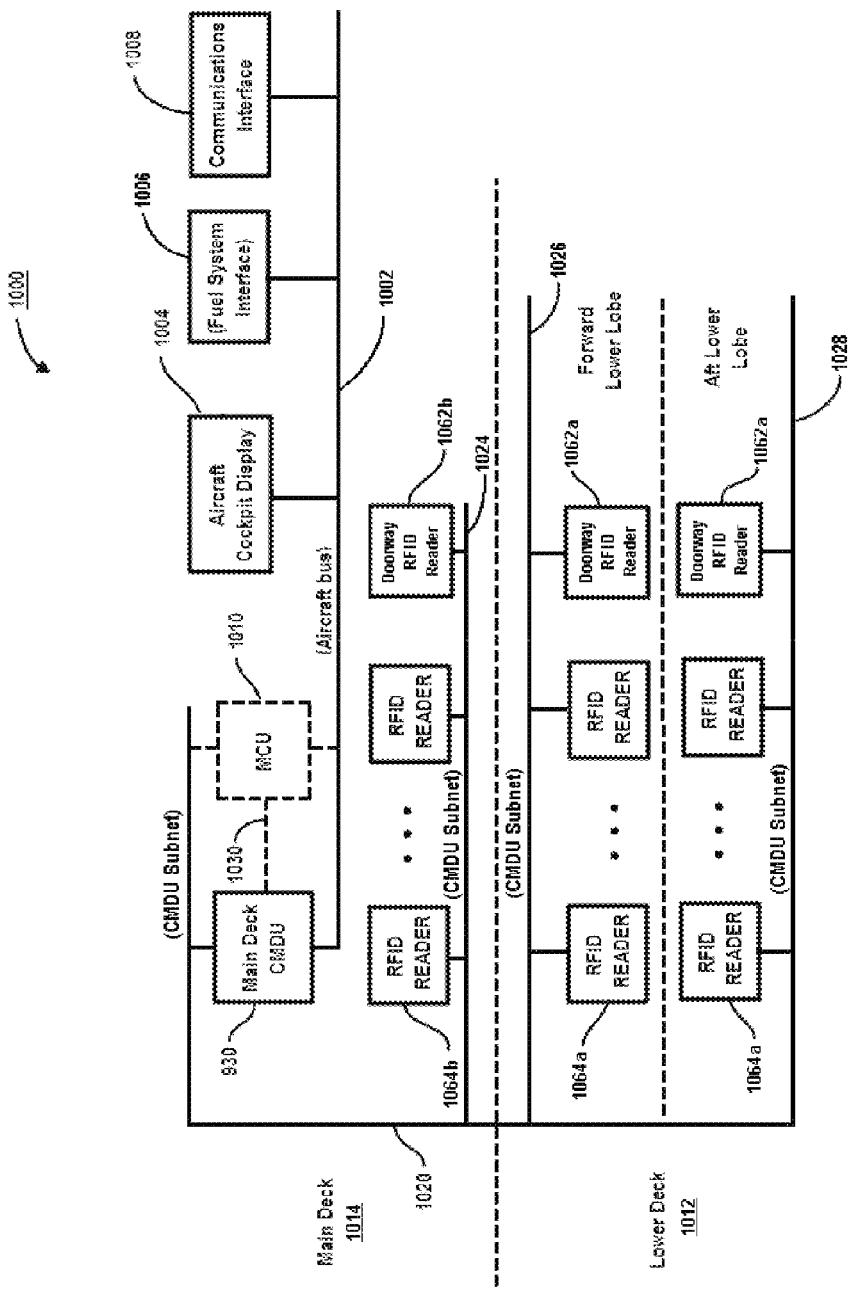
FIG. 29 is a schematic diagram showing a cargo container location system.

FIG. 29 shows one embodiment of an integrated cargo monitoring and control system 1000 with wireless ULD detection. As shown in FIG. 29, the integrated cargo monitoring system 1000 can include components on each of an aircraft's cargo decks. In the embodiment shown in FIG. 29, for example, the system 1000 is adapted for use with an aircraft having a main or upper cargo deck 1014 and a lower cargo deck 1012 having a forward lower lobe and an aft lower lobe. The system 1000 can include a Cargo Maintenance Display Unit ("CMDU") 930 like that described above. As shown in FIG. 25 and as described above, the CMDU 930 can also be operably connected to the various components and subsystems for monitoring and optionally controlling operation of all of an aircraft's PDUs 920, 951, 952, 990 and 992. As shown in FIG. 29, the CMDU 930 can also be coupled to a plurality of RFID readers 1062b, 1064b on the main deck 1014, and a plurality of RFID readers 1062a, 1064a in the forward and aft lobes of the lower deck 1012. As also shown in FIG. 29, the CMDU 930 can be connected to the various RFID readers 1062a, 1062b, 1064; 1064b via a CMDU/RFID subnet 1020. The CMDU/RFID subnet 1020 can include a plurality of branches 1024, 1026, 1028 which interconnect components within the various cargo compartments 1012, 1014 and lobes, and can be an Ethernet-type network, a Controller Area Network (CAN), or the like. As shown in FIG. 28, the CMDU 930 can optionally be coupled to a master control unit (MCU) 1010 by a wired or wireless communication link 1030. The CMDU 930 and optional MCU 1010 can be connected to a number of different aircraft subsystems via a main aircraft bus 1002. For example, the CMDU 930 and optional MCU 1010 can communicate with an aircraft's cockpit user interface 1004, an aircraft's fuel system interface 1006, and an aircraft's communications interface 1008, and the like, via the main aircraft bus 1002.

The number of long-range readers 1064a, 1064b connected to each branch of the subnet 1020 depends on such factors as the type and range of the readers, the length of the corresponding compartment and the desired ULD positional accuracy. While an aircraft is being loaded, the short-range doorway readers 1062a, 1062b can obtain information from the ULD RFID tags 1260a, 1260b and relay the information to the CMDU 930 and/or the MCU 1010 via the subnet 1020. This information is then can be stored in the memory of the CMDU 930 and/or MCU 1010. The stored data can be queried or otherwise accessed via the aircraft bus 1002 or the subnet 1020.

Both during and after loading ULDs, the RFID tags 1260a, 1260b on the ULDs cooperate with the long-range RFID readers 1064a, 1064b in each cargo compartment to provide the CMDU 930 and/or MCU 1010 with information sufficient to determine, within a reasonable level of precision, the position of each ULD within each cargo compartment. The position of each ULD can be determined by known triangulation methods based on the time delay of arrival of various signals from the RFID tags 1260*a*, 1260*b* at the various long-range readers 1264*a*, 1264*b*.

In one embodiment, the RFID tags 1260*a*, 1260*b* are active, and each tag 1260*a*, 1260*b* emits a signal at a predetermined time interval. The signaled information can include a tag number and other information specific to an associated ULD, for example. In another embodiment, each wireless tag 1260*a*, 1260*b* is passive, and transmits information when interrogated by an RFID reader 1062*a*, 1062*b*, 1064*a*, 1064*b*.

The CMDU 930 can include a general purpose computer that is capable of storing and executing software programs, and can include a processor, volatile and non-volatile memory, a user interface/display, and the like. In one embodiment, the CMDU 930 can be located on the main cargo deck adjacent to a cargo door, for example. The memory of the CMDU 930 can store, inter alia, information about an associated aircraft for use in executing aircraft weight and balance calculations, for example. Such information can include an aircraft's Operating Weight Empty ("OWE") and the location of an empty aircraft's center of gravity (CG), for example. As is known to those skilled in the art, the CG of an aircraft is a point in three dimensional space which is almost invariably located within the fuselage of the aircraft. Each aircraft also has a three-dimensional "CG operating volume" within which the center of gravity must lie to ensure safe operation of the aircraft during loading, take-off, flight, landing, unloading and other activities. Information regarding an aircraft's CG operating volume can be stored within the memory of the CMDU 930.

The aircraft cockpit display 1004 can be configured to present information to the flight crew from the CMDU 930. The aircraft cockpit display cockpit 1004 can include a user interface which presents graphical/text-based reporting of weight and balance information for a given flight configuration and reports on the ULDs onboard as well as specific information for each ULD on a particular flight, for example.

The fuel system interface 1006 can provide the CMDU 930 with information about the aircraft's current fuel status, such as the current quantity and/or current weight of fuel onboard and the distribution of that fuel in the tanks. Such information can be used by the CMDU 930 for determining and displaying an aircraft's current weight and balance status.

The communications interface 1008 can be configured to wirelessly receive and send information about the cargo and calculated weight and balance information. Thus, prior to loading, the CMDU 930 may receive an aircraft's cargo loading manifest, which contains information about each ULD to be loaded, including its tag number, its type, its specific weight, its planned stowed position on the aircraft, and the like. During loading, the CMDU 930 may send information to the cargo terminal about the current weight and balance condition of an associated aircraft. Once an aircraft has landed, the communications interface 1008 may wirelessly send information about the aircraft's ULDs to the destination cargo terminal prior to unloading the aircraft. For example, the communications interface 1008 may be used to send information to a web server which can provide information about ULD contents over the web to authorized parties. This information may be used to facilitate the unloading process, and notify the owners of the cargo, or others, that their cargo has arrived.

Figure 30:
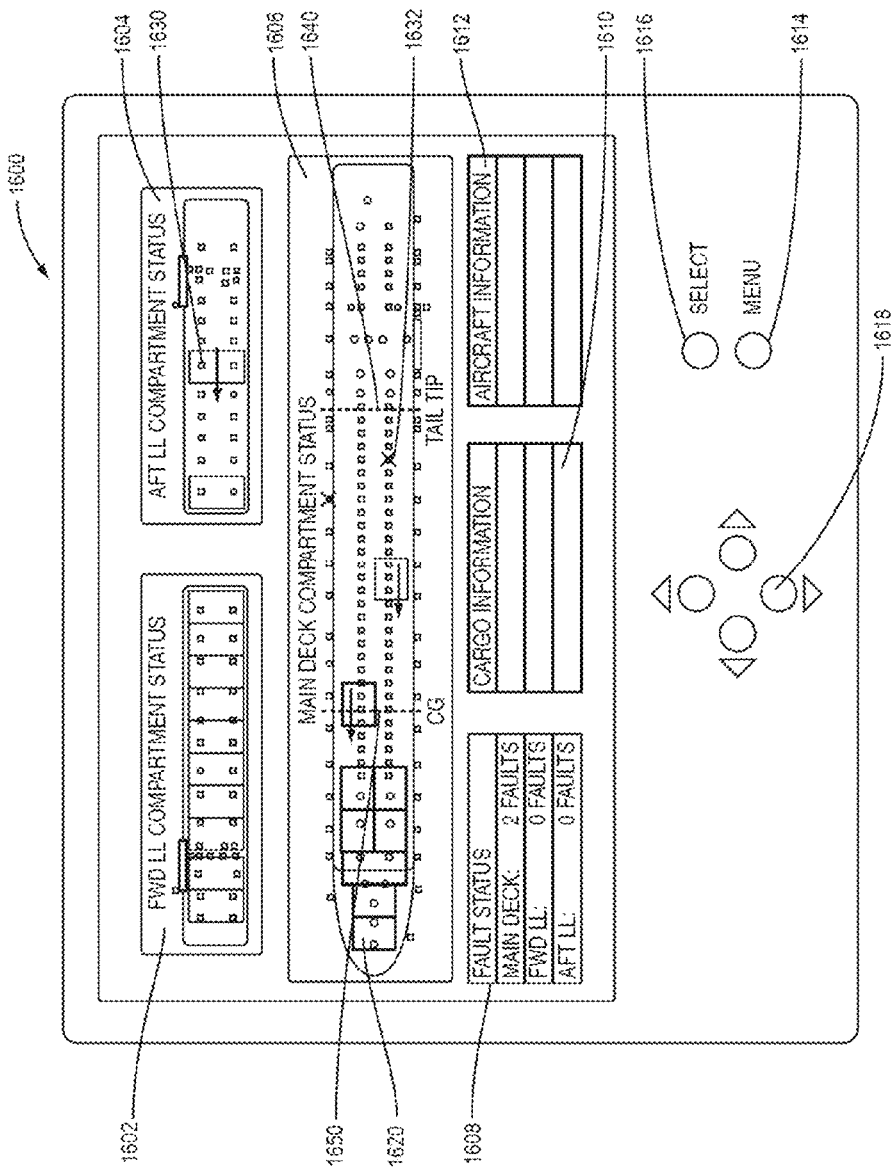
FIG. 30 is a front view of a display screen of a cargo monitoring display unit.

The CMDU 930 can include a CMDU display 1600 like that shown in FIG. 30, for example. The CMDU display screen 1600 may be selectively displayed on the main deck CMDU 930 to indicate real-time status within an aircraft's cargo compartments. A similar display screen may also be presented on the forward lower lobe CMDU 960 and/or the aft lower lobe CMDU 994 shown in FIG. 25, for example. As shown in FIG. 30, the display screen 1600 can include simultaneous graphical representations of a main deck compartment 1606, a forward lower lobe compartment 1602, and an aft lower lobe compartment 1604. The CMDU display 1600 may include graphic representations of one or more ULDs 1620 that have been fully loaded in a particular cargo compartment, and may include graphic representations of the present locations and travel directions of one or more ULDs 1630 that presently are being moved to or from a stowage location within a particular cargo compartment. The cargo control portions 902, 904, 906 of the integrated system 900 shown in FIG. 25 can include one or more ULD-sensing PDUs to sense and track the current location of a particular ULD within an aircraft's cargo compartments. For example, the system 900 can include one or more ULD-sensing PDUs as described in U.S. Pat. No. 6,834,758 to Goodrich Corporation. In addition, the CMDU display 1600 shown in FIG. 30 can graphically indicate the positions of the ULDs 1620, 1630 based upon information provided to the CMDU 930 by the plurality of RFID readers 1062*a*, 1062*b*, 1064*a*, 1064*b*, 1065 shown in FIGS. 26-28 and described above.

As described above, the CMDU 930 can be used to monitor the locations of ULDs in one or more cargo compartments, and also can be configured to permit a user to selectively control operation of an aircraft's PDUs. Alternatively, the CMDU 930 can be configured to track, monitor and display ULD locations and other ULD information and cargo system information, and a MCU 1010 can be used to selectively control operation of the PDUs. As shown in FIG. 29, a MCU 1010 can be coupled to the CMDU 930 by a communication link 1030 which permits information and commands to be exchanged between the units 930, 1010. Alternatively or in addition, the CMDU 930 can be coupled to the MCU 1010 by the subnet 1020. In one embodiment, the CMDU 930 and MCU 1010 can be located proximate to one another at a convenient location within a cargo compartment, such as adjacent to cargo door, for example. As shown in FIG. 29, the MCU 1010 can be connected to the various RFID readers 1062*a*, 1062*b*, 1064*a*, 1064*b* via the subnet 1020.

The CMDU 930 can be the primary interface for the system 1000, and can be configured to display output on behalf of the MCU 1010, and to relay operator commands to the MCU 1010. During normal operation, the CMDU 930 may display the loading status of the cargo compartment systems, and may provide real-time feedback regarding the cargo loading manifest or aircraft load and trim sheets (i.e., the preplanned load configuration) versus the as-loaded configuration, as detected by the RFID readers 1062*a*, 1062*b*, 1064*a*, 1064*b*, for example. The various information may be displayed in both text and graphical forms. The CMDU 930 may also be configured for use as a local maintenance terminal for an aircraft weight and balance calculation system if an Onboard Maintenance System ("OMS") terminal is not available, for example.

As shown in FIG. 29, the CMDU display screen 1600 can display various graphic representations of ULD locations and cargo systems information, such as the location of a faulty or inactive PDU 1632, an indication of a current "tail tip" boundary 1640 beyond which ULDs should not be moved, an indication of a current aircraft center of gravity 1650 based on the positions of currently stowed ULDs 1620, the positions of not-yet-stowed ULDs 1630, other aircraft weight and balance information, and the like. In order to display the tail-tip and CG information, the CMDU 930 or an associated processor can be configured to calculate the current weight and balance parameters based upon current ULD location information received by the CMDU 930 from the RFID readers 1062a, 1062b, 1064a, 1064b, 1065 shown in FIGS. 26-28 together with available weight information for each identified and located ULD, for example. When measured weight information for each ULD is unavailable, the system can associate a maximum weight for a particular type of ULD with each ULD of that type, and such associated maximum weights can be used to calculate current total weight and current balance conditions. In addition, the CMDU display 1600 shown in FIG. 30 can include other current information regarding equipment fault status 1608, other cargo information 1610, other aircraft information 1612, and the like. In one embodiment, the display screen 1600 can include a touch screen operable to detect touch commands from a user. As shown in FIG. 29, the display screen 1600 can include a touch screen menu "button" for selecting a menu of user options, a touch screen select "button" 1616 for selecting a particular user option, a series of navigation "buttons" 1618 for moving a cursor or navigating a menu, and the like.

Though the system 1000 shown in FIG. 29 has been described as including a single CMDU 930 located on a main deck of an aircraft, the system 1000 can also include one or more additional CMDUs located in one or more other cargo compartments. For example, the forward lower lobe CMDU 960 and aft lower lobe CMDU 994 shown in FIG. 25 can be substantially the same as or substantially similar to the main deck CMDU 930 described above.

The combined systems 900, 1000 described above can be used by one or more persons to monitor and control the loading of cargo onto an aircraft and to monitor and control the unloading of cargo from an aircraft. For example, a person such as a main deck load master can stand proximate to a CMDU 930 located adjacent to main deck side door during loading or unloading activities. The load master can use the CMDU 930 to selectively display information regarding the status of the main deck PDUs 920, the forward lower lobe PDUs 951, 952, and/or the aft lower lobe PDUs 990, 992 shown in FIG. 25, for example. The load master can also use this information to selectively control operation of the PDUs 920, 951, 952, 990, 992 via the CMDU 930 or via an adjacent MCU 1010, Master Control Panel, or another adjacent control device, for example. By viewing displayed information like that shown in FIG. 30, for example, the load master can determine that a particular PDU 1632 is inoperative and cannot be relied upon during loading or unloading operations. The load master can also take necessary steps to see that a faulty PDU 1632 will be inspected, repaired or replaced, for example. In addition, the load master can use the CMDU 930 to selectively display information regarding the current positions of ULDs that are either stowed or in transit within any of the aircraft's multiple cargo compartments. The load master also can use information provided by the CMDU 930 to assess the aircraft's current weight and balance condition. For example, the load master can identify the aircraft's current tail tip boundary 1640 by viewing a CMDU display 1600 like that shown in FIG. 30, for example, and can take measures to ensure that no ULD passes aft of the indicated tail tip boundary 1640 until a sufficient counteracting load has been stowed at forward locations within the aircraft. In the event of a tail tip condition, the load master can use the system 900 to switch off power to the lower deck to prevent cargo in the lower deck from moving farther aft and worsening the tail tip condition. The load master can also identify the location of the aircraft's current center of gravity by viewing the CMDU display 1600 shown in FIG. 30, for example, and take corrective measures if the present location of the aircraft's center of gravity is not within prescribed boundaries. For example, the load master can use the CMDU 930 to identify the weights of specific ULDs at particular locations within a cargo compartment, and can then arrange or rearrange the ULDs in a particular arrangement that will correct an imbalance condition or provide an acceptable balance configuration.

Accordingly, though an operator cannot directly visually observe all aspects of a cargo loading or loading operation while positioned at one location within an aircraft, the combined systems 900, 1000 permit the operator to monitor substantially all aspects of the cargo loading or unloading operation in real time while located at a single stationary position in the aircraft. As a result, the time to load or unload an aircraft can be reduced by eliminating the time normally required for a load master to go from one cargo compartment to another to monitor the status of loading or unloading operations.

In addition, when the system 900 includes one or more additional CMDUs 960, 994 in one or more other cargo compartments as shown in FIG. 25, for example, one or more other persons can also simultaneously monitor substantially all aspects of a cargo loading or unloading operation in real time via one of the additional CMDUs 960, 994. In addition, because the system 900 can be coupled to an aircraft's airplane information management system ("AIMS") 997 as shown in FIG. 25, a person remote from the CMDUs 930, 960, 994 can also observe real time information provided by the system 900, such as via an aircraft's Onboard Maintenance System ("OMS"), via a portable electronic flight bag (EFB), via an aircraft's cockpit display, or the like. In addition, the loading process monitored by the system 900 can be recorded if desired.

The cargo loading and monitoring system 900 shown in FIG. 25 and described above can include software that permits the system 900 to interface with various aircraft and cargo system components and subsystems. For example, a freight common turntable (FCT) doorway PDU can be provided with internal software that interfaces with the main deck CMDU 930. In addition, the main deck CMDU 930 can include software that provides a suitable user interface, and can also include Line Replacement Unit (LRU) software for monitoring, isolating and reporting system faults. Control system software for the system 900 can be designed to permit continued cargo system operation in the event of a LRU failure. The system 900 can also include software that enables the system to provide detailed component failure descriptions which are viewable from the CMDU 930, and communicates control system fault status information to an aircraft's maintenance system.

Figure 31:
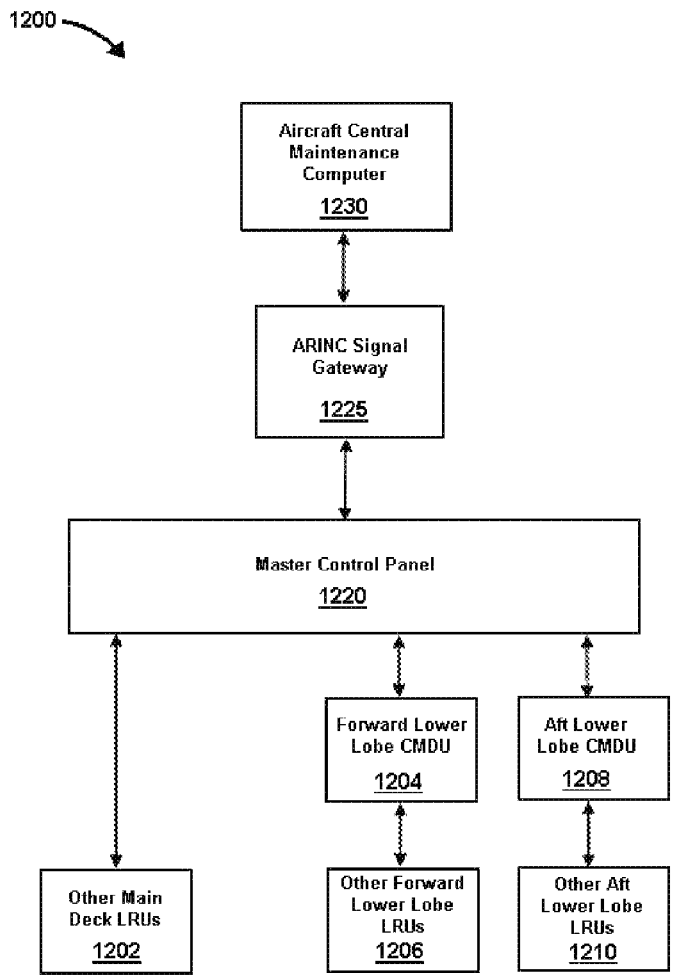
FIG. 31 is a schematic diagram of a built in test equipment system for an integrated cargo loading and monitoring system.

The system 900 can provide LRU fault detection monitoring for all cargo compartments. In one embodiment, the system 900 can be configured to monitor a plurality of LRUs, such as a main deck and lower deck master control panels, a main deck outside control panel, one or more local control panels, main deck and lower deck spring-lift and self-lift powered drive units, a freighter common turntable (FCT), lower deck lateral guide control relays, AC power relays, and the like. As shown in FIG. 31, the system 900 can be configured to provide built-in test equipment (BITE) reporting 1200, whereby the pass/fail status for various LRUs can be broadcast from a main deck Master Control Panel (MCP) 1220 to a Central Maintenance Computer 1230. As shown in FIG. 31, the pass/fail status of a main deck Master Control Panel 1222, other main deck LRUs 1202, a forward lower lobe CMDU 1204 and other forward lower lobe LRUs 1206, an aft lower lobe CMDU 1208 and other aft lower lobe LRUs

1210 is reported to an aircraft's Central Maintenance Computer 1230 via the MCP 1220 and an ASG Card 1230. As also shown in FIG. 31, the system also permits information received by the MCP 1220 from the Central Maintenance Computer 1230 to be forwarded to the various LRUs 1202, 1204, 1206, and 1208. Such forwarded information can include time and date information, flight departure information, flight phase information, aircraft identification information, data requests, and the like.

The system 900 can be configured such that BITE tests can be performed at various levels or stages. For example, the system 900 can be used to conduct a first level of BITE tests at system startup, including processor tests, RAM tests, ROM tests, communications bus tests, and the like. A second level of BITE testing can occur during system use, including status monitoring of control panels and PDUs, monitoring of power and lateral guide relay positions, container movement and actuator timing, and the like. A third level of BITE testing can include interactive tests initiated by maintenance personnel, including automated algorithms and test sequences for comprehensive testing of all system inputs and outputs. The third level of BITE testing can be used to isolate faults down to the LRU level, and to verify repaired or replaced LRUs. Interactive tests can include PDU drive and brake tests, FCT steer tests, FCT lift and retract tests, PDU and FCT sensor tests, control panel switch tests, control panel indicator tests, lateral guide tests, and the like. The system 900 can include non-volatile memory for long-term retention of system fault information for review and/or uploading to the Central Maintenance Computer 1230.

The above descriptions of various embodiments of the invention are intended to describe and illustrate various aspects and features of the invention. Persons of ordinary skill in the art will understand that certain changes and modifications can be made to the described embodiments without departing from the scope of the invention. All such changes and modifications are intended to be within the scope of the appended claims.

What is claimed is:

1. A cargo loading and monitoring system for an aircraft having a plurality of separate cargo compartments, the system comprising:
   (a) a first processor in communication with a plurality of power drive units located within a first cargo compartment;
   (b) a second processor in communication with a plurality of power drive units located within a second cargo compartment, the second cargo compartment being separate from the first cargo compartment;
   (c) a first cargo monitoring display unit located in the first cargo compartment, the first cargo monitoring display unit being in communication with the second processor and capable of: (i) displaying information received from the power drive units located in both cargo compartments, and (ii) controlling operation of the power drive units located in both cargo compartments; and
   (d) a second cargo monitoring display unit located in the second cargo compartment, the second cargo monitoring display unit being in communication with the first processor and capable of: (i) displaying information received from the power drive units located in both cargo compartments, and (ii) controlling operation of the power drive units located in both cargo compartments.

2. A cargo loading and monitoring system according to claim 1 further comprising at least one sensor in the first cargo compartment and being in communication with the cargo monitoring display unit, wherein the sensor is configured to detect the location of a cargo container within the first cargo compartment and to communicate the detected location to the cargo monitoring display unit, and wherein the cargo monitoring display unit located in a second cargo compartment is configured to display the detected location of the cargo container within the first cargo compartment.

3. A cargo loading and monitoring system according to claim 2 wherein the first processor is configured to calculate a center of gravity of the aircraft based on the detected location of the cargo container, and wherein the cargo monitoring display unit is configured to display the calculated center of gravity.

4. A cargo loading and monitoring system according to claim 2 wherein the first processor is further configured to determine a tail tip boundary based on the calculated center of gravity, and wherein the cargo monitoring display unit is configured to display the determined tail tip boundary.

5. A cargo loading and monitoring system according to claim 1 wherein the power drive units in the first cargo compartment include built-in test equipment, and wherein the cargo monitoring display unit in the second cargo compartment includes a user interface configured to permit a person to test operation of at least one of the power drive units via the built-in test equipment.

6. A cargo loading and monitoring system according to claim 1 wherein the cargo monitoring display unit located in the second cargo compartment is configured to simultaneously display aircraft balance information, power drive unit status information, and the locations of a plurality of cargo containers located within the first cargo compartment.

7. A cargo loading and monitoring system according to claim 1 further comprising:
   (e) a third processor in communication with a plurality of power drive units located within a third cargo compartment;
   (f) a third cargo monitoring display unit located in the third cargo compartment, the third cargo monitoring display unit being in communication with the first and second processors, wherein:
   each of first, second and third cargo monitoring display units is configured to: (i) selectively display information received from the power drive units located in the first, second and third cargo compartments, and (ii) control operation of the power drive units located in the first, second and third cargo compartments.

8. A cargo loading and monitoring system for an aircraft having a plurality of separate cargo compartments, the system comprising:
   (a) a first processor in communication with a first cargo monitoring display unit located in a first cargo compartment;
   (b) a plurality of power drive units within the first cargo compartment, each power drive unit within the first cargo compartment being coupled to the first processor;
   (c) a second processor in communication with a second cargo monitoring display unit located in a second cargo compartment separate from the first cargo compartment;
   (d) a plurality of power drive units within the second cargo compartment, each power drive unit in the second cargo compartment being coupled to the second processor;
   (e) at least one sensor in the first cargo compartment configured to detect the location of a cargo container within the first cargo compartment, and at least one sensor in the second cargo compartment configured to detect the location of a cargo container within the second cargo compartment; wherein:

(f) the first processor and second processors are in communication with each other such that each processor is capable of receiving information from the other processor and also from the power drive units and sensors in both cargo compartments;

(g) the first and second cargo monitoring display units are each capable of: (i) displaying information received from both processors and also from the power drive units and sensors in both cargo compartments, and (ii) controlling operation of the power drive units in both cargo compartments.

9. A cargo loading and monitoring system according to claim 8 wherein the sensors are radio frequency identification readers configured to detect the location of a radio frequency identification tag on the cargo container.

10. A cargo loading and monitoring system according to claim 9 wherein the sensors are further configured to receive data transmitted by the radio frequency identification tag.

11. A cargo loading and monitoring system according to claim 8 wherein the information from the first processor includes a current status of at least one of the plurality of power drive units located in the first cargo compartment.

12. A cargo loading and monitoring system according to claim 8 wherein:

the second processor is configured to calculate a current center of gravity of the aircraft based on information received from at least one of the first processor, the power drive units and the sensor located in the first cargo compartment, and the second processor is configured to graphically display the current center of gravity of the aircraft on the second cargo monitoring display unit.

13. A cargo loading and monitoring system according to claim 8 wherein:

the second processor is configured to calculate a tail tip boundary of the aircraft based on information received from at least one of the first processor, the power drive units and the sensor located in the first cargo compartment, and the second processor is configured to graphically display the tail tip boundary of the aircraft on the second cargo monitoring display unit.

14. A cargo loading and monitoring system according to claim 8 wherein the second cargo monitoring display unit is configured to selectively display the location of the cargo container within the first cargo compartment.

15. A cargo loading and monitoring system according to claim 8 further comprising:

(h) a third processor in communication with a third cargo monitoring display unit located in a third cargo compartment;

(i) a plurality of power drive units within the third cargo compartment, each power drive unit within the third cargo compartment being coupled to the third processor;

(j) at least one sensor in the third cargo compartment configured to detect the location of a cargo container within the third cargo compartment, wherein:

each of first, second and third cargo monitoring display units is capable of: (i) selectively displaying information received from the first, second and third processors and also from the power drive units and sensors in the first, second and third cargo compartments, and (ii) controlling operation of the power drive units in the first, second and third cargo compartments.

16. A method of remotely monitoring a process of loading a plurality of cargo containers into an aircraft having a plurality of power drive units located in a first cargo compartment and a plurality of power drive units located in a second cargo compartment separate from the first cargo compartment, the first cargo compartment and the second cargo compartment each having a user interface located therein, the method comprising:

a) determining the locations of the cargo containers within the first cargo compartment and also within the second cargo compartment;

b) determining the status of each of the power drive units in the first cargo compartment and also within the second cargo compartment; and c) from the user interface located in either the first cargo compartment or the second cargo compartment:

(i) graphically displaying the locations of the cargo containers and the status of each of the power drive units in the other cargo compartment, and (ii) controlling operation of the power drive units within the other cargo compartment; wherein:

the user interfaces in both the first and second cargo compartments are capable of said graphically displaying and controlling.

17. The method of claim 16 further comprising calculating a center of gravity of the aircraft based on the determined locations of the cargo containers within the first cargo compartment, and graphically displaying the calculated center of gravity in the second cargo compartment.

18. The method of claim 17 further comprising calculating a tail tip boundary of the aircraft based on the determined locations of the cargo containers within the first cargo compartment, and graphically displaying the calculated tail tip boundary in the second cargo compartment.

19. The method of claim 16 further comprising testing operation of one of the power drive units located in the first cargo compartment via the user interface located in the second cargo compartment.

20. The method of claim 16 wherein determining the locations of the cargo containers within the first cargo compartment includes scanning a radio frequency identification tag on each of the cargo containers with a plurality of spaced radio frequency identification readers located in the first cargo compartment.

* * * * *